US006875132B2

(12) United States Patent  
Hayashi et al.

(10) Patent No.: US 6,875,132 B2  
(45) Date of Patent: Apr. 5, 2005

(54) MULTI-PIECE SOLID GOLF BALL

(75) Inventors: Junji Hayashi, Chichibu (JP); Yasumasa Shimizu, Chichibu (JP); Hiroshi Higuchi, Chichibu (JP); Rinya Takesue, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 10/720,522

(22) Filed: Nov. 25, 2003

(65) Prior Publication Data

US 2004/0106478 A1 Jun. 3, 2004

(30) Foreign Application Priority Data

Nov. 29, 2002 (JP) ........................................ 2002-349213

(51) Int. Cl.$^7$ ................................................ A63B 37/06
(52) U.S. Cl. ...................... 473/374; 473/473; 473/370; 473/377
(58) Field of Search ................................ 473/377, 376, 473/378, 351, 371, 373, 374, 370

(56) References Cited

U.S. PATENT DOCUMENTS

| 4,955,613 A | * | 9/1990 | Gendreau et al. ........... 473/372 |
| 5,306,760 A | | 4/1994 | Sullivan |
| 5,312,857 A | | 5/1994 | Sullivan |
| 5,795,247 A | | 8/1998 | Yokota et al. |
| 6,348,016 B2 | * | 2/2002 | Nakamura ................... 473/371 |
| 2003/0114246 A1 | * | 6/2003 | Yokota ........................ 473/351 |
| 2003/0229183 A1 | * | 12/2003 | Voorheis et al. ............. 525/232 |

FOREIGN PATENT DOCUMENTS

| JP | 07-268132 A | 10/1995 |
| JP | 08-276033 A | 10/1996 |
| JP | 09-313643 A | 12/1997 |
| JP | 10-305114 A | 11/1998 |
| JP | 11-035633 A | 2/1999 |
| JP | 11-114094 A | 4/1999 |
| JP | 2000-225209 A | 8/2000 |
| JP | 2001-218873 A | 8/2001 |
| JP | 2002-210042 A | 7/2002 |
| JP | 2002-293996 A | 10/2002 |
| WO | WO 98/46671 A1 | 10/1998 |

OTHER PUBLICATIONS

Mark R. Mason et al.; "Hydrolysis of Tri–tert–butylaluminum: The First Structural Characterization of Alkylalumoxanes $[(R_2Al)_2O]_n$ and $(RAlO)_n$"; American Chemical Society; 115; 1993; pp. 4971–4984.

C. Jeff Harlan et al.; "Three–Coordinate Aluminum Is Not A Prerequisite for Catalytic Activity in the Zirconocene–Alumoxane Polymerization of Ethylene"; American Chemical Society; 117; 1995; pp. 6465–6474.

Report of Research & Development; Fine Chemical; vol. 23; No. 9; Jun. 1, 1994; pp. 5–15.

* cited by examiner

*Primary Examiner*—Raeann Gorden  
(74) *Attorney, Agent, or Firm*—Sughrue Mion, PLLC

(57) ABSTRACT

In a multi-piece solid golf ball comprising a solid core, a mantle and a cover, the solid core is made of a rubber composition comprising a base rubber containing a polybutadiene synthesized using a rare-earth catalyst, a small amount of organic peroxide, an unsaturated carboxylic acid and/or a metal salt thereof, an organic sulfur compound and an inorganic filler. The mantle is made of a thermoplastic resin composition. The cover is made primarily of a mixture of an ionomer resin-containing resin composition and an inorganic filler. This construction provides the golf ball with a combination of outstanding flight performance and soft feel with cover's scuff resistance and crack durability, that is unprecedented.

16 Claims, 2 Drawing Sheets

MULTI-PIECE SOLID GOLF BALL

BACKGROUND OF THE INVENTION

1. Field of the Invention

The present invention relates to golf balls which have an outstanding flight performance, an excellent scuff resistance and a soft "feel" upon impact.

2. Prior Art

Golf balls have hitherto been modified and improved in a variety of ways to address the numerous and diverse requirements of golfers. The present assignee, among others, has already disclosed many outstanding golf balls.

For example, JP-A 9-313643 describes an all-round golf ball which has excellent flight characteristics and durability, a good, soft feel on impact, and controllability.

JP-A 10-305114 discloses a golf ball having a dramatically increased carry and a good feel on impact.

JP-A 11-114094 teaches a golf ball in which deflection by the solid core and the relative thicknesses and hardnesses of the cover and the mantle have been optimized so to provide a good trajectory and increased carry on shots with a driver, suitable spin characteristics and good controllability on approach shots, excellent feel on impact and excellent durability.

JP-A 2000-225209 relates to golf balls with an excellent overall performance that have the feel, durability and rebound characteristics required of a ball construction subject to limitations with respect to solid core deformation, hardness of the cover and the mantle and dimple characteristics, and that also have excellent flight characteristics.

JP-A 2001-218873 describes a golf ball of outstanding feel, controllability and flight performance—including carry, in which the mantle and/or cover are formed of specific materials, and in which the respective Shore D hardnesses of the solid core center and surface and of the mantle and the cover are such as to satisfy the following relationship: solid core center hardness≦mantle hardness≦cover hardness.

JP-A 2002-210042 discloses a golf ball having a very soft feel on impact yet good durability and also having a low spin, high angle of elevation and high rebound that together provide increased carry. This prior-art golf ball is achieved by specifying all of the following: center hardness, surface hardness and diameter of the solid core, mantle hardness, thickness and material, cover hardness, thickness and material, difference in hardness between mantle and solid core surface, difference in hardness between cover and mantle, relationship between hardness gradient from mantle to cover and hardness gradient from center of core to mantle, and dimple arrangement.

JP-A 8-276033 teaches a way of obtaining a solid golf ball having a good feel on impact and a long carry by setting the difference A-B between the compression deflection A by the core when subjected to a final load of 130 kgf from an initial load of 10 kgf and the compression deflection B by the ball when subjected to a final load of 130 kgf from an initial load of 10 kgf within a specific range.

These prior-art golf balls all have an excellent feel and an excellent carry and other flight characteristics, and can be suitably adapted to various requirements dictated by the skill level of the golfer and the intended use of the ball (e.g., recreational or competitive). Yet, given the ever-high expectations of golfers, there exists a need for golf balls endowed with an even better performance.

SUMMARY OF THE INVENTION

It is therefore an object of the present invention to provide golf balls which have excellent flight characteristics and scuff resistance, and which also have a soft feel on impact.

We have found that multi-piece solid golf balls constructed of a solid core, a mantle of at least one layer and a cover can be conferred with better flight characteristics, a higher scuff resistance and a softer feel on impact than prior-art golf balls by having the solid core made of a specific rubber composition and endowed with a specific degree of flexibility and diameter, having the mantle made of a specific thermoplastic resin composition and endowed with a specific thickness and hardness, having the cover made of a specific resin composition and endowed with a specific thickness and hardness, and setting the flexibility of the overall golf ball within a specific range.

Accordingly, this invention provides a multi-piece solid golf ball constructed of a solid core, a mantle of at least one layer which encloses the core, and a cover which encloses the mantle, wherein the solid core is made of a rubber composition comprising (A) 100 parts by weight of a base rubber that contains 60 to 100 wt % of a polybutadiene of at least 60% cis-1,4 structure and synthesized using a rare-earth catalyst, (B) 0.1 to 0.8 part by weight of an organic peroxide, (C) an unsaturated carboxylic acid and/or a metal salt thereof, (D) an organic sulfur compound and (E) an inorganic filler, has a deflection when subjected to a load of 980 N (100 kgf) of 3.5 to 6.5 mm, and has a diameter of 30 to 40 mm; the mantle of at least one layer is made of a thermoplastic resin composition, has a thickness per layer of 0.5 to 2.0 mm, and includes an outermost layer which is in contact with the cover and has a Shore D hardness of 20 to 60; the cover is made primarily of a mixture of (F) 100 parts by weight of a resin composition containing an ionomer resin and (G) 5 to 40 parts by weight of an inorganic filler, has a thickness of 0.5 to 2.5 mm, has a Shore D hardness of 50 to 70, and satisfies the condition (Shore D hardness of mantle outermost layer)≦(Shore D hardness of cover); and the golf ball has a deflection when subjected to a load of 980 N (100 kgf) of 3.0 to 5.5 mm.

The polybutadiene is typically a modified polybutadiene prepared by synthesis using a neodymium catalyst, followed by reaction with a terminal modifier.

Preferably, the rubber composition includes (A) 100 parts by weight of a base rubber containing 60 to 100 wt % of a polybutadiene of at least 60% cis-1,4 structure and synthesized using a rare-earth catalyst, (B) 0.1 to 0.8 part by weight of at least two kinds of organic peroxide, (C) 10 to 60 parts by weight of an unsaturated carboxylic acid and/or a metal salt thereof, (D) 0.1 to 5 parts by weight of an organic sulfur compound, and (E) 5 to 80 parts by weight of an inorganic filler.

The thermoplastic resin composition making up the mantle is preferably composed of 100 parts by weight of resin components which include a base resin of (P) an olefin/unsaturated carboxylic acid binary random copolymer and/or a metal ion neutralization product of an olefin/unsaturated carboxylic acid binary random copolymer in admixture with (Q) an olefin/unsaturated carboxylic acid/unsaturated carboxylic acid ester ternary random copolymer and/or a metal ion neutralization product of an olefin/unsaturated carboxylic acid/unsaturated carboxylic acid ester ternary random copolymer in a weight ratio P/Q of 100:0 to 25:75, and (R) a non-ionomeric thermoplastic elastomer in a weight ratio (P+Q)/R of 100:0 to 50:50; (S) 5 to 80 parts by weight of a fatty acid or/or fatty acid derivative having a molecular weight of 280 to 1,500; and (T) 0.1 to 10 parts by weight of a basic inorganic metal compound capable of neutralizing un-neutralized acid groups in the base resin and component S.

Preferably, the mantle consists of an inner layer and an outer layer.

Component F, the resin composition containing an ionomer resin is preferably composed primarily of a mixture of (M) an amino-terminated block polymer and (N) an ionomer resin in a weight ratio M/N of 3/97 to 60/40.

The cover is preferably composed primarily of a mixture of (F) 100 parts by weight of a resin composition containing an ionomer resin and (G) 5 to 30 parts by weight of barium sulfate.

Typically the golf ball cover bears a plurality of dimples on a surface thereof. Each dimple has a spatial volume below a planar surface circumscribed by an edge of the dimple and having a surface area circumscribed by the dimple edge on a hypothetical sphere represented by the surface of the golf ball cover were it to have no dimples. It is preferable for the golf ball to have a dimple volume occupancy VR, defined as the ratio of the sum of the individual dimple volumes to the volume of the hypothetical sphere, of 0.70 to 1.00%, and a dimple surface coverage SR, defined as the ratio of the sum of the individual dimple surface areas to the surface area of the hypothetical sphere, of 70 to 85%.

Most often, the golf ball has a weight of 45.0 to 45.93 g.

DETAILED DESCRIPTION OF THE INVENTION

Figure 1:
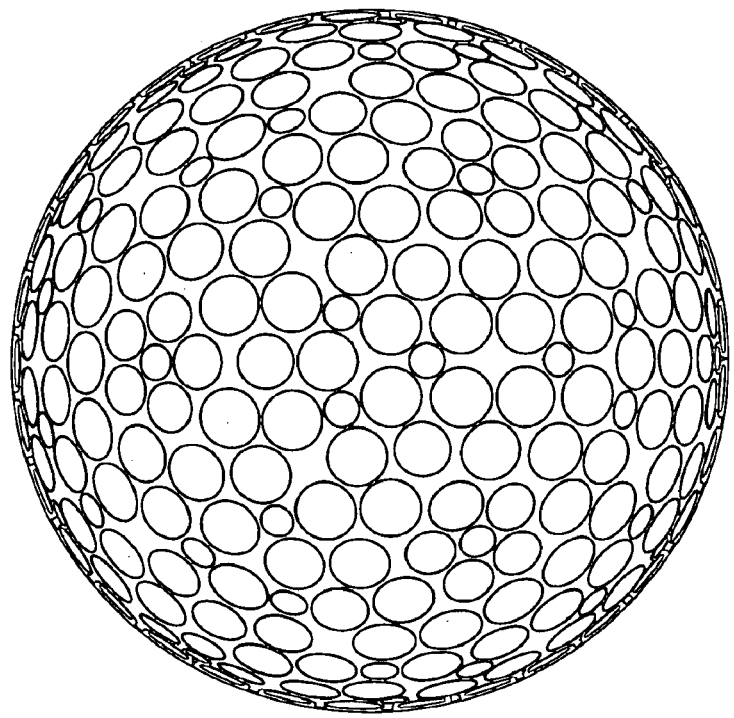
FIG. 1 shows exemplary arrangements of dimples of sets A and C in Table 4 on golf balls.
Figure 1:
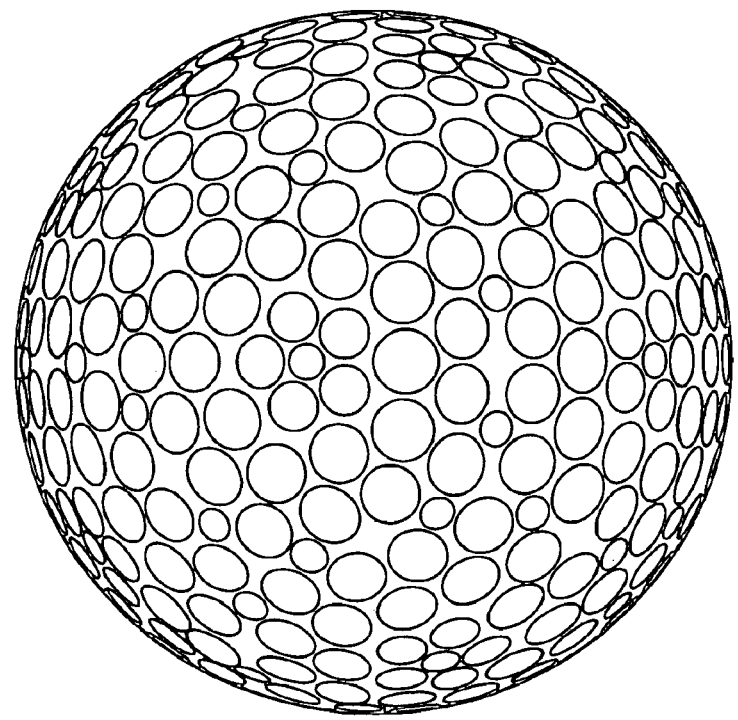

The solid core in the golf ball of the invention is made of a rubber composition which includes:

(A) a base rubber that contains 60 to 100 wt % of a polybutadiene of at least 60% cis-1,4 structure and synthesized using a rare-earth catalyst,
(B) an organic peroxide,
(C) an unsaturated carboxylic acid and/or a metal salt thereof,
(D) an organic sulfur compound, and
(E) an inorganic filler.

In component A, which is a base rubber that contains 60 to 100 wt % of a polybutadiene of at least 60% cis-1,4 structure and synthesized using a rare-earth catalyst, the content of cis-1,4 units in the polybutadiene is at least 60%, preferably at least 80%, more preferably at least 90%, and most preferably at least 95%. At a cis-1,4 unit content of less than 60%, suitable resilience is not achieved.

The polybutadiene in the invention is synthesized using a rare-earth catalyst. A known rare-earth catalyst may be used for this purpose. Exemplary catalysts include lanthanide series rare-earth compounds in combination with organoaluminum compounds, alumoxanes, halogen-bearing compounds or Lewis bases.

Examples of suitable lanthanide series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently a hydrogen or a hydrocarbon residue of 1 to 8 carbons).

Preferred alumoxanes include compounds of the structures shown in formulas (I) and (II) below. The alumoxane association complexes described in Fine Chemical 23, No. 9, 5 (1994), J. Am. Chem. Soc. 115, 4971 (1993), and J. Am. Chem. Soc. 117, 6465 (1995) are also acceptable.

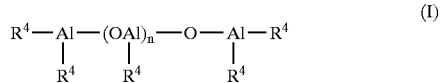

(I)

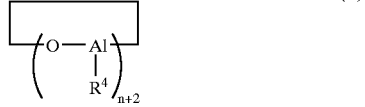

(II)

In the above formulas, $R^4$ is a hydrocarbon group having 1 to 20 carbon atoms, and n is 2 or a larger integer.

Examples of halogen-bearing compounds that may be used include aluminum halides of the formula $AlX_nR_{3-n}$ (wherein X is a halogen; R is a hydrocarbon residue of 1 to 20 carbons, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$ (wherein "Me" stands for methyl); and other metal halides such as silicon tetrachloride, tin tetrachloride and titanium tetrachloride.

The Lewis base can be used to form a complex with the lanthanide series rare-earth compound. Illustrative examples include acetylacetone and ketone alcohols.

In the practice of the invention, the use of a neodymium catalyst in which a neodymium compound serves as the lanthanide series rare-earth compound is advantageous because it enables a polybutadiene rubber having a high cis-1,4 unit content and a low 1,2-vinyl unit content to be obtained at an excellent polymerization activity. Preferred examples of such rare-earth catalysts include those mentioned in JP-A 11-35633.

To achieve a polybutadiene having a cis unit content within the above range and a desirable polydispersity Mw/Mn, the polymerization of butadiene in the presence of a rare-earth catalyst containing a lanthanide series rare-earth compound is carried out at a butadiene/(lanthanide series rare-earth compound) molar ratio of preferably 1,000 to 2,000,000, and especially 5,000 to 1,000,000, and at an $AlR^1R^2R^3$/(lanthanide series rare-earth compound) molar ratio of 1 to 1,000, and especially 3 to 500. It is also preferable for the (halogen compound)/(lanthanide series rare-earth compound) molar ratio to be 0.1 to 30, and especially 0.2 to 15, and for the (Lewis base)/(lanthanide series rare-earth compound) molar ratio to be 0 to 30, and especially 1 to 10.

The polymerization of butadiene in the presence of a rare-earth catalyst may be carried out either in a solvent or by bulk polymerization or vapor phase polymerization without the use of solvent, and at a polymerization temperature in a range of generally −30° C. to 150° C., and preferably 10 to 100° C.

The polybutadiene has a Mooney viscosity ($ML_{1+4}$ (100° C.)) of generally at least 40, preferably at least 50, more preferably at least 52, and most preferably at least 54, but generally not more than 140, preferably not more than 120, more preferably not more than 100, and most preferably not more than 80. At a Mooney viscosity outside of the above range, the rubber composition may be more difficult to work and the resulting solid core may have a lower resilience.

The term "Mooney viscosity" used herein refers in each case to an industrial index of viscosity (see JIS K6300) as measured with a Mooney viscometer, which is a type of rotary plastometer. This value is represented by the symbol $ML_{1+4}$ (100° C.), wherein "M" stands for Mooney viscosity, "L" stands for large rotor (L-type), and "1+4" stands for a pre-heating time of 1 minute and a rotor rotation time of 4 minutes. The "100° C." indicates that measurement was carried out at a temperature of 100° C.

According to a preferred embodiment of the invention, the polybutadiene may be a modified polybutadiene obtained by polymerization using the above-described rare-earth catalyst, followed by the reaction of a terminal modifier with active end groups on the polymer.

Any known terminal modifier may be used. Examples include terminal modifiers of types (1) to (7) below.

(1) Alkoxysilyl group-bearing compounds, and preferably alkoxysilane compounds having at least one epoxy group or isocyanate group on the molecule. Specific examples include epoxy group-bearing alkoxysilanes such as 3-glycidyloxypropyltrimethoxysilane, 3-glycidyloxypropyltriethoxysilane, (3-glycidyloxypropyl)methyldimethoxysilane, (3-glycidyloxypropyl)methyldiethoxysilane, β-(3,4-epoxycyclohexyl)trimethoxysilane, β-(3,4-epoxycyclohexyl)triethoxysilane, β-(3,4-epoxycyclohexyl)methyldimethoxysilane, β-(3,4-epoxycyclohexyl)ethyldimethoxysilane, condensation products of 3-glycidyloxypropyltrimethoxysilane and condensation products of (3-glycidyloxypropyl)methyldimethoxysilane; and isocyanate group-bearing alkoxysilane compounds such as 3-isocyanatopropyltrimethoxysilane, 3-isocyanatopropyltriethoxysilane, (3-isocyanatopropyl)methyldimethoxysilane, (3-isocyanatopropyl)methyldiethoxysilane, condensation products of 3-isocyanatopropyltrimethoxysilane and condensation products of (3-isocyanatopropyl)methyldimethoxysilane.

A Lewis acid can be added to accelerate the reaction when the above alkoxysilyl group-bearing compound is reacted with active end groups. The Lewis acid acts as a catalyst to promote the coupling reaction, thus improving cold flow by the modified polymer and providing a better shelf stability. Examples of suitable Lewis acids include dialkyltin dialkyl malates, dialkyltin dicarboxylates and aluminum trialkoxides.

Other types of terminal modifiers that may be used include:

(2) halogenated organometallic compounds, halogenated metallic compounds and organometallic compounds of the general formulas $R^5{}_nM'X_{4-n}$, $M'X_4$, $M'X_3$, $R^5{}_nM'(-R^6-COOR^7)_{4-n}$ or $R^5{}_nM'(-R^6-COR^7)_{4-n}$ (wherein $R_5$ and $R^6$ are each independently a hydrocarbon group of 1 to 20 carbons; $R^7$ is a hydrocarbon group of 1 to 20 carbons which may contain pendant carbonyl or ester groups; M' is a tin, silicon, germanium or phosphorus atom; X is a halogen atom; and n is an integer from 0 to 3);
(3) heterocumulene compounds having on the molecule a Y=C=Z linkage (wherein Y is a carbon, oxygen, nitrogen or sulfur atom; and Z is an oxygen, nitrogen or sulfur atom);
(4) three-membered heterocyclic compounds containing on the molecule the following bonds

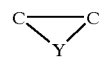

(wherein Y is an oxygen, nitrogen or sulfur atom);
(5) halogenated isocyano compounds;
(6) carboxylic acids, acid halides, ester compounds, carbonate compounds and acid anhydrides of the respective formulas $R^8-(COOH)_m$, $R^9(COX)_m$, $R^{10}-(COO-R^{11})_m$, $R^{12}-OCOO-R^{13}$ and $R^{14}-(COOCO-R^{15})_m$, and compounds of the formula

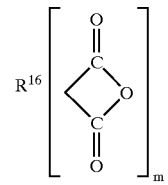

(wherein $R^8$ to $R^{16}$ are each independently a hydrocarbon group of 1 to 50 carbons, X is a halogen atom, and m is an integer from 1 to 5); and
(7) carboxylic acid metal salts of the formula $R^{17}{}_lM''(OCOR^{18})_{4-l}$ or $R^{19}{}_lM''(OCO-R^{20}-COOR^{21})_{4-l}$, and compounds of the formula

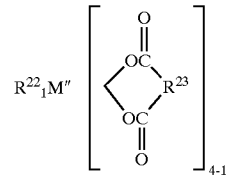

(wherein $R^{17}$ to $R^{23}$ are each independently a hydrocarbon group of 1 to 20 carbons, M" is a tin, silicon or germanium atom, and l is an integer from 0 to 3).

The above terminal modifiers and methods for their reaction are described in, for example, JP-A 11-35633, JP-A 7-268132 and JP-A 2002-293996.

Of the above catalysts, rare-earth catalysts, and especially neodymium catalysts, are especially preferred.

It is advantageous for the polybutadiene used in the invention to have a polydispersity index Mw/Mn (where Mw is the weight-average molecular weight, and Mn is the number-average molecular weight) of at least 2.0, preferably at least 2.2, more preferably at least 2.4, and most preferably at least 2.6, but not more than 8.0, preferably not more than 7.5, more preferably not more than 4.0, and most preferably not more than 3.4. If the polydispersity index Mw/Mn is too low, the rubber composition may be more difficult to work. On the other hand, if Mw/Mn is too large, the solid core may have a lower resilience.

In the practice of the invention, component A is a base rubber composed primarily of the above-described polybutadiene. The polybutadiene content within the base rubber is at least 60 wt %, preferably at least 70 wt %, more preferably at least 80 wt %, and most preferably at least 85 wt %. The content of the above polybutadiene in the base rubber may be as much as 100 wt %, although the polybutadiene content can be set to 95 wt % or less, or in some cases 90 wt % or less. At a polybutadiene content within the base rubber of less than 60 wt %, the core has a poor resilience.

In addition to the above-described polybutadiene, the base rubber serving as component A may include also other polybutadienes, such as polybutadienes prepared using a group VIII metal compound catalyst, and other diene rubbers, some examples of which are styrene-butadiene rubber, natural rubber, isoprene rubber and ethylene-propylene-diene rubber.

Of the rubber ingredients other than the above-described polybutadiene, the use of a second polybutadiene prepared using a group VIII catalyst and having a Mooney viscosity ($ML_{1+4}$ (100° C.)) of less than 50 and a viscosity η at 25° C., as a 5 wt % toluene solution, of at least 200 mPa·s but not more than 400 mPa·s is preferable for achieving a high resilience and good workability.

Group VIII catalysts that may be used include nickel catalysts and cobalt catalysts.

Examples of suitable nickel catalysts include single-component systems such as nickel-kieselguhr, binary systems such as Raney nickel/titanium tetrachloride, and ternary systems such as nickel compound/organometallic compound/boron trifluoride etherate. Exemplary nickel compounds include reduced nickel on a carrier, Raney nickel, nickel oxide, nickel carboxylate and organonickel complex salts. Exemplary organometallic compounds include trialkylaluminum compounds such as triethylaluminum, tri-n-propylaluminum, triisobutylaluminum and tri-n-hexylaluminum; alkyllithium compounds such as n-butyllithium, sec-butyllithium, tert-butyllithium and 1,4-dilithiumbutane; and dialkylzinc compounds such as diethylzinc and dibutylzinc.

Examples of suitable cobalt catalysts include the following composed of cobalt or cobalt compounds: Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite and cobalt dinitrosyl chloride. It is particularly advantageous to use these compounds in combination with, for example, a dialkylaluminum monochloride such as diethylaluminum monochloride or diisobutylaluminum monochloride; a trialkylaluminum such as triethylaluminum, tri-n-propylaluminum, triisobutylaluminum or tri-n-hexylaluminum; an alkylaluminum sesquichloride such as ethylaluminum sesquichloride; or aluminum chloride.

Polymerization using the group VIII catalysts described above, and especially a nickel or cobalt catalyst, can generally be carried out by a process in which the catalyst is continuously charged into the reactor together with a solvent and the butadiene monomer. The reaction conditions are suitably selected from a temperature range of 5 to 60° C. and a pressure range of atmospheric pressure to 70 plus atmospheres, so as to yield a product having the above-indicated Mooney viscosity.

The second polybutadiene has a Mooney viscosity of less than 50, preferably no more than 48, and most preferably no more than 45. It is advantageous for the lower limit in the Mooney viscosity to be at least 10, preferably at least 20, more preferably at least 25, and most preferably at least 30.

The second polybutadiene has a viscosity η at 25° C., as a 5 wt % solution in toluene, of at least 200 mPa·s, preferably at least 210 mPa·s, more preferably at least 230 mPa·s, and most preferably at least 250 mPa·s, but not more than 400 mPa·s, preferably not more than 370 mPa·s, more preferably not more than 340 mPa·s, and most preferably not more than 300 mPa·s.

In the invention, the "viscosity η at 25° C. as a 5 wt % solution in toluene" (in mPa·s) refers to the value obtained by dissolving 2.28 g of the polybutadiene to be measured in 50 ml of toluene and using as the reference fluid a standard fluid for viscometer calibration (JIS Z8809) to carry out measurement at 25° C. with the requisite viscometer.

The second polybutadiene is typically included in the base rubber in an amount of 0% or more, preferably at least 5%, and more preferably at least 10% by weight, but not more than 40%, preferably not more than 30%, even more preferably not more than 20%, and most preferably not more than 15% by weight.

It is preferable to use at least two kinds of organic peroxide as component B in the invention. If (a) represents the organic peroxide having the shortest half-life at 155° C., (b) represents the organic peroxide having the longest half-life at 155° C., and the half-lives of (a) and (b) are denoted as $a_t$ and $b_t$, respectively, it is desirable for the half-life ratio $b_t/a_t$ to be at least 7, preferably at least 8, more preferably at least 9, and most preferably at least 10, but not more than 20, preferably not more than 18, and most preferably not more than 16. Even with the use of two or more organic peroxides, at a half-life ratio outside of the above range, the desired level of rebound, compression and durability may not be achieved.

It is desirable for (a) to have a half-life at at 155° C. of at least 5 seconds, preferably at least 10 seconds, and most preferably at least 15 seconds, but not more than 120 seconds, preferably not more than 90 seconds, and most preferably not more than 60 seconds. It is desirable for (b) to have a half-life $b_t$ at 155° C. of at least 300 seconds, preferably at least 360 seconds, and most preferably at least 420 seconds, but not more than 800 seconds, preferably not more than 700 seconds, and most preferably not more than 600 seconds.

Specific examples of suitable organic peroxides include dicumyl peroxide, 1,1-bis(t-butylperoxy)-3,5,5-trimethylcyclohexane and α,α'-bis(t-butylperoxy)diisopropylbenzene. These organic peroxides may be commercially available products, such as Percumil D (available from NOF Corporation), Perhexa 3M (NOF Corporation) and Luperco 231XL (available from Atochem Co.). The use of 1,1-bis(t-butylperoxy)-3,5,5-trimethylcyclohexane as above organic peroxide (a) and dicumyl peroxide as above organic peroxide (b) is preferred.

The overall amount of organic peroxide, including (a) and (b) above, per 100 parts by weight (abbreviated hereinafter as "parts") of component A, is at least 0.1 part, preferably at least 0.2 part, more preferably at least 0.3 part, and most preferably at least 0.4 part, but nor more that 0.8 part, preferably not more than 0.7 part, more preferably not more than 0.6 part, and most preferably not more than 0.5 part. Too little organic peroxide increases the time required for crosslinking, substantially lowering both productivity and compression. On the other hand, too much organic peroxide lowers the rebound and durability of the ball.

In the practice of the invention, by using in the golf ball core a polybutadiene synthesized using a rare-earth catalyst, and especially a neodymium catalyst, and by setting the amount of organic peroxide used in the core within the above-indicated range, the golf ball of the invention can be conferred with excellent rebound characteristics. Such an increase in rebound allows the solid core or the golf ball as a whole to be made correspondingly softer, resulting in desirable initial conditions on a full shot with a driver (i.e., low spin and high angle of elevation) as well as increased carry. Moreover, a soft feel on impact can also be achieved.

The amount of organic peroxide (a) included in the solid core per 100 parts of component A is preferably at least 0.05 part, more preferably at least 0.08 part, and most preferably at least 0.1 part, but preferably not more than 0.5 part, more preferably not more than 0.4 part, and most preferably not more than 0.3 part. The amount of organic peroxide (b) included per 100 parts of component A is preferably at least 0.05 part, more preferably at least 0.15 part, and most preferably at least 0.2 part, but preferably not more than 0.7 part, more preferably not more than 0.6 part, and most preferably not more than 0.5 part.

Component C in the invention is an unsaturated carboxylic acid and/or a metal salt thereof. Examples of suitable unsaturated carboxylic acids include acrylic acid, methacrylic acid, maleic acid and fumaric acid. Acrylic acid and methacrylic acid are especially preferred. Examples of suitable metal salts of the unsaturated carboxylic acids include zinc salts and magnesium salts. Of these, zinc acrylate is especially preferred.

The amount of component C per 100 parts of component A is generally at least 10 parts, preferably at least 15 parts, and most preferably at least 20 parts, but generally not more than 60 parts, preferably not more than 50 parts, more preferably not more than 45 parts, and most preferably not more than 40 parts. An amount of component C outside of the above range may compromise the rebound characteristics and feel upon impact of the golf ball.

Component D in the invention is an organic sulfur compound. Exemplary organic sulfur compounds include thiophenols, thionaphthols, halogenated thiophenols, and metal salts thereof. Specific examples include pentachlorothiophenol, pentafluorothiophenol, pentabromothiophenol, p-chlorothiophenol, and the zinc salts thereof; diphenylpolysulfides, dibenzylpolysulfides, dibenzoylpolysulfides, dibenzothiazoylpolysulfides and dithiobenzoylpolysulfides having 2 to 4 sulfurs; alkylphenyldisulfides, furan ring-bearing sulfur compounds and thiophene ring-bearing sulfur compounds. Diphenyldisulfide and the zinc salt of pentachlorothiophenol are especially preferred.

The amount of component D per 100 parts of component A is generally at least 0.1 part, preferably at least 0.2 part, more preferably at least 0.4, and most preferably at least 0.7 part, but generally not more than 5 parts, preferably not more than 4 parts, more preferably not more than 3 parts, even more preferably not more than 2 parts, and most preferably not more than 1.5 parts. The addition of too little component D may fail to have a resilience-improving effect, whereas too much component D may result in a low hardness and insufficient resilience.

Component E in the invention is an inorganic filler, illustrative examples of which include zinc oxide, barium sulfate and calcium carbonate. The amount of component E per 100 parts of component A is generally at least 5 parts, preferably at least 7 parts, more preferably at least 10 parts, and most preferably at least 13 parts, but generally not more than 80 parts, preferably not more than 65 parts, more preferably not more than 50 parts, and most preferably not more than 40 parts. The use of too much or too little component E may make it impossible to achieve a golf ball having the proper weight and a desirable rebound.

If necessary, the rubber composition containing above components A to E may include also an antioxidant. The amount of antioxidant added per 100 parts of component A is generally at least 0.05 part, preferably at least 0.1 part, and more preferably at least 0.2 part, but not more than 3 parts, preferably not more than 2 parts, more preferably not more than 1 part, and most preferably not more than 0.5 part.

The antioxidant may be a commercially available product, such as Nocrac NS-6, Nocrac NS-30 (both made by Ouchi Shinko Chemical Industry Co., Ltd.), and Yoshinox 425 (made by Yoshitomi Pharmaceutical Industries, Ltd.).

The solid core of the inventive golf ball is produced from a rubber composition containing above components A to E by a process that preferably involves vulcanization and curing of the rubber composition. For example, vulcanization may be carried out at a temperature of 100 to 200° C. for a period of 10 to 40 minutes.

The solid core formed as described above has a localized hardness which can be adjusted as appropriate and is not subject to any particular limitation. That is, the core thus formed may have a localized hardness profile which is flat from the center to the surface of the core, or which varies from the center to the surface.

It is desirable for the solid core to have a diameter of at least 30 mm, preferably at least 32 mm, and most preferably at least 34 mm, but not more than 40 mm, preferably not more than 39 mm, and most preferably not more than 38 mm. A solid core diameter of less than 30 mm compromises the feel upon impact and the rebound of the golf ball. On the other hand, at a solid core diameter of more than 40 mm, the ball has a poor durability to cracking.

The solid core has a deflection, when subjected to a load of 980 N (100 kg), of at least 3.5 mm, preferably at least 3.7 mm, more preferably at least 4.0 mm, and most preferably at least 4.2 mm, but not more than 6.5 mm, preferably not more than 6.3 mm, more preferably not more than 6.0 mm, and most preferably not more than 5.8 mm. A deflection of less than 3.5 mm worsens the feel upon impact and, particularly on long shots such as with a driver in which the ball incurs a large deformation, subjects the ball to an excessive increase in spin, reducing the carry. On the other hand, at a deflection of more than 6.5 mm, the golf ball has a less lively feel when hit and an inadequate rebound that results in a poor carry, in addition to which it has a poor durability to cracking with repeated impact.

It is recommended that the solid core have a specific gravity ($g/cm^3$) of generally at least 0.9, preferably at least 1.0, and most preferably at least 1.1, but not more than 1.4, preferably not more than 1.3, and most preferably not more than 1.2.

The thermoplastic resin composition used to form the mantle composed of at least one layer is preferably made of 100 parts by weight of resin components which include a base resin of (P) an olefin/unsaturated carboxylic acid binary random copolymer and/or a metal ion neutralization product of an olefin/unsaturated carboxylic acid binary random copolymer in admixture with (Q) an olefin/unsaturated carboxylic acid/unsaturated carboxylic acid ester ternary random copolymer and/or a metal ion neutralization product of an olefin/unsaturated carboxylic acid/unsaturated carboxylic acid ester ternary random copolymer in a weight ratio P/Q of 100:0 to 25:75, and (R) a non-ionomeric thermoplastic elastomer in a weight ratio (P+Q)/R of 100:0 to 50:50; (S) 5 to 80 parts by weight of a fatty acid and/or fatty acid derivative having a molecular weight of 280 to 1,500; and (T) 0.1 to 10 parts by weight of a basic inorganic metal compound capable of neutralizing un-neutralized acid groups in the base resin and component S.

The olefins in the above base resin, both in component P and component Q, have a number of carbons that is generally at least 2, but not more than 8, and preferably not more than 6. Suitable examples include ethylene, propylene, butene, pentene, hexene, heptene and octene. Ethylene is especially preferred.

Illustrative examples of the unsaturated carboxylic acid include acrylic acid, methacrylic acid, maleic acid and fumaric acid. Acrylic acid and methacrylic acid are especially preferred.

The unsaturated carboxylic acid ester is preferably a lower alkyl ester of the unsaturated carboxylic acid. Specific examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

The olefin/unsaturated carboxylic acid binary random copolymer of component P and the olefin/unsaturated carboxylic acid/unsaturated carboxylic acid ester ternary random copolymer of component Q (the copolymers in components P and Q are hereinafter referred to collectively as "random copolymers") can each be obtained by suitably formulating the above-described materials and using a known method to carry out random copolymerization.

It is recommended that the above random copolymers be prepared such as to have a specific unsaturated carboxylic acid content (sometimes referred to hereinafter as the "acid content"). The amount of unsaturated carboxylic acid included within the random copolymer of component P is generally at least 4 wt %, preferably at least 6 wt %, more preferably at least 8 wt %, and most preferably at least 10 wt %, but generally not more than 30 wt %, preferably not more than 20 wt %, more preferably not more than 18 wt %, and most preferably not more than 15 wt %.

Similarly, it is recommended that the amount of unsaturated carboxylic acid included within the random copolymer of component Q be generally at least 4 wt %, preferably at least 6 wt %, and most preferably at least 8 wt %, but not more than 15 wt %, preferably not more than 12 wt %, and most preferably not more than 10 wt %. If the random copolymers have too low an acid content, the resilience may decline. On the other hand, too high an acid content may lower the processability of the thermoplastic resin composition.

The metal ion neutralization product of an olefin/unsaturated carboxylic acid binary random copolymer in component P and the metal ion neutralization product of an olefin/unsaturated carboxylic acid/unsaturated carboxylic acid ester ternary random copolymer in component Q (the metal ion neutralization products of copolymers in components P and Q are hereinafter referred to collectively as "metal ion-neutralized random copolymers") can be obtained by partially neutralizing the acid groups on the random copolymer with metal ions.

Illustrative examples of metal ions for neutralizing the acid groups include $Na^+$, $K^+$, $Li^+$, $Zn^{2+}$, $Cu^{2+}$, $Mg^{2+}$, $Ca^{2+}$, $Co^{2+}$, $Ni^{2+}$ and $Pb^{2+}$. Preferred metal ions include $Na^+$, $Li^+$, $Zn^{2+}$ and $Mg^{2+}$. The use of $Zn^{2+}$ is especially recommended.

In the practice of the invention, the metal ion-neutralized random copolymers may be prepared by neutralization with the above metal ions. For example, use may be made of a neutralization method that involves the use of compounds such as the formates, acetates, nitrates, carbonates, bicarbonates, oxides, hydroxides or alkoxides of the above metal ions. The degree of neutralization of the random copolymer by these metal ions is not subject to any particular limitation.

In the invention, the metal ion-neutralized random copolymers are preferably zinc ion-neutralized ionomer resins. Such ionomer resins increase the melt flow rate of the material, facilitate adjustment to the subsequently described optimal melt flow rate, and thus enable the moldability of the thermoplastic resin composition to be improved.

Commercial products may be used in the base resin made up of above components P and Q. Examples of commercial products that may be used as the random copolymer in component P include Nucrel 1560, Nucrel 1214 and Nucrel 1035 (all products of DuPont-Mitsui Polychemicals Co., Ltd.); and Escor 5200, Escor 5100 and Escor 5000 (all products of ExxonMobil Chemical). Examples of commercial products that may be used as the random copolymer in component Q include Nucrel AN4311 and Nucrel AN4318 (both products of DuPont-Mitsui Polychemicals Co., Ltd.); and Escor ATX325, Escor ATX320 and Escor ATX310 (all products of ExxonMobil Chemical).

Examples of commercial products that may be used as the metal ion-neutralized random copolymer in component P include Himilan 1554, Himilan 1557, Himilan 1601, Himilan 1605, Himilan 1706 and Himilan AM7311 (all products of DuPont-Mitsui Polychemicals Co., Ltd.), Surlyn 7930 (produced by E.I. du Pont de Nemours and Co., Inc.) and Iotek 3110 and Iotek 4200 (both products of ExxonMobil Chemical). Examples of commercial products that may be used as the metal ion-neutralized random copolymer in component Q include Himilan 1855, Himilan 1856 and Himilan AM7316 (all products of DuPont-Mitsui Polychemicals Co., Ltd.), Surlyn 6320, Surlyn 8320, Surlyn 9320 and Surlyn 8120 (all products of E.I. du Pont de Nemours and Co., Inc.), and Iotek 7510 and Iotek 7520 (both products of ExxonMobil Chemical). Examples of zinc-neutralized ionomer resins that can be preferably used as the above metal ion-neutralized random copolymers include Himilan 1706, Himilan 1557 and Himilan AM7316.

When the above-described base resin is prepared, the weight ratio P/Q of component P to component Q must be set at from 100:0 to 25:75, preferably from 100:0 to 50:50, more preferably from 100:0 to 75:25, and most preferably 100:0. Too little component P lowers the resilience of the molded material.

In addition, by adjusting the relative proportions of random copolymer and metal ion-neutralized random copolymer metal in the base resin of above components P and Q, the moldability of the thermoplastic resin composition can be further improved. It is recommended that that the ratio of random copolymer to metal ion-neutralized random copolymer be generally from 0:100 to 60:40, preferably from 0:100 to 40:60, more preferably from 0:100 to 20:80, and most preferably 0:100. The presence of too much random copolymer may lower the processability during mixing.

Component R is a non-ionomeric thermoplastic elastomer which is optionally included to further enhance both the feel of the golf ball upon impact and its rebound characteristics. In the invention, the above-described base resin and component R are referred to collectively as the "resin components." Specific examples of non-ionomeric thermoplastic elastomers that may be used as component R include olefin elastomers, styrene elastomers, polyester elastomers, urethane elastomers and polyamide elastomers. The use of olefin elastomers and polyester elastomers is preferred for further increasing resilience.

Examples of commercial products that may be used as component R include olefin elastomers such as Dynaron (manufactured by JSR Corporation) and polyester elastomers such as Hytrel (manufactured by DuPont-Toray Co., Ltd.).

It is recommended that the amount of component R per 100 parts of the base resin in the thermoplastic resin composition be at least 0 part, preferably at least 1 part, more preferably at least 2 parts, even more preferably at least 3 parts, and most preferably at least 4 parts, but not more than 100 parts, preferably not more than 60 parts, more preferably not more than 40 parts, and most preferably not more than 20 parts. Too much component R may lower the compatibility of the mixture and markedly compromise the durability of the golf ball.

Next, component S in the thermoplastic resin composition is a fatty acid or fatty acid derivative having a molecular weight of 280 to 1,500. This component has a very low molecular weight compared to the base resin and is used to adjust the melt viscosity of the mixture to a suitable level, particularly to help improve flow. Component S has a relatively high content of acid groups (or derivatives thereof) and can suppress an excessive loss of resilience.

The molecular weight of the fatty acid or fatty acid derivative of component S is at least 280, preferably at least 300, more preferably at least 330, and most preferably at least 360, but not more than 1,500, preferably not more than 1,000, more preferably not more than 600, and most preferably not more than 500. Too low a molecular weight may prevent a better heat resistance from being achieved, whereas too high a molecular weight may make it impossible to improve flow.

Preferred examples of the fatty acid or fatty acid derivative serving as component S include unsaturated fatty acids having a double bond or triple bond on the alkyl group and derivatives thereof, and saturated fatty acids in which all the bonds on the alkyl group are single bonds and derivatives thereof. It is recommended that the number of carbons on the molecule be generally at least 18, preferably at least 20, more preferably at least 22, and most preferably at least 24, but not more than 80, preferably not more than 60, more preferably not more than 40, and most preferably not more than 30. Too few carbons may prevent a better heat resistance from being achieved and may also make the content of acid groups so high as to diminish the flow-enhancing effect on account of interactions between acid groups in component S and acid groups present in the base resin. On the other hand, too many carbons increases the molecular weight, which may prevent the flow-enhancing effect from being achieved.

Specific examples of fatty acids that may be used as component S include stearic acid, 12-hydroxystearic acid, behenic acid, oleic acid, linoleic acid, linolenic acid, arachidic acid and lignoceric acid. Of these, stearic acid, arachidic acid, behenic acid and lignoceric acid are preferred. Behenic acid is especially preferred.

Fatty acid derivatives which may be used as component S include metallic soaps in which the proton on the acid group of the fatty acid has been substituted with a metal ion. Metal ions that may be used in such metallic soaps include $Na^+$, $Li^+$, $Ca^{2+}$, $Mg^{2+}$, $Zn^{2+}$, $Mn^{2+}$, $Al^{3+}$, $Ni^{2+}$, $Fe^{2+}$, $Fe^{3+}$, $Cu^{2+}$, $Sn^{2+}$, $Pb^{2+}$ and $Co^{2+}$. Of these, $Ca^{2+}$, $Mg^{2+}$ and $Zn^{2+}$ are preferred.

Specific examples of fatty acid derivatives that may be used as component S include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

Moreover, known metallic soap-modified ionomers, including those described in U.S. Pat. Nos. 5,312,857, 5,306,760 and International Application WO 98/46671, may be used as the base resin (above components P and Q) in combination with above component S.

Component T is a basic inorganic metal compound which can neutralize acid groups in the base resin and component S. When a metallic soap-modified ionomer resin (e.g., the metallic soap-modified ionomer resins mentioned in the above-cited prior-art patent publications) is used alone without including component T, the metallic soap and the un-neutralized acid groups present on the ionomer resin undergo exchange reactions during mixture under heating, generating a large amount of fatty acid. Because the fatty acid has a low thermal stability and readily vaporizes during molding, it may cause molding defects. Moreover, it adheres to the surface of the molded article, which can substantially lower paint film adhesion.

To overcome such problems and improve the resilience of the molded mantle, it is essential to include a basic inorganic metal compound (component T) which neutralizes acid groups present in the base resin and in component S.

That is, incorporating above component T in the thermoplastic resin composition results in a suitable degree of neutralization of the acid groups in the base resin and in component S. Moreover, optimizing the various components in this way produces synergistic effects which increase the thermal stability of the mixture, impart a good processability and make it possible to enhance the resilience of the mantle.

It is recommended that the basic inorganic metal compound used as component T be one which has a high reactivity with the base resin and includes no organic acids in the reaction by-products, thus enabling the degree of neutralization of the mixture to be increased without a loss of thermal stability.

Illustrative examples of the metal ions in the basic inorganic metal compound serving as component T include $Li^+$, $Na^+$, $K^+$, $Ca^{2+}$, $Mg^{2+}$, $Zn^{2+}$, $Al^{3+}$, $Ni^2$, $Fe^2$, $Fe^{3+}$, $Cu^{2+}$, $Mn^{2+}$, $Sn^{2+}$, $Pb^{2+}$ and $Co^{2+}$. Known basic inorganic fillers containing these metal ions may be used as the basic inorganic metal compound. Specific examples include magnesium oxide, magnesium hydroxide, magnesium carbonate, zinc oxide, sodium hydroxide, sodium carbonate, calcium oxide, calcium hydroxide, lithium hydroxide and lithium carbonate. A hydroxide or a monoxide is recommended. Calcium hydroxide and magnesium oxide, both of which have a high reactivity with the base resin, are preferred. Calcium hydroxide is especially preferred.

In the golf ball of the invention, the above-described thermoplastic resin composition which makes up the mantle having at least one layer is arrived at by blending specific respective amounts of components S and T with the resin components; that is, the base resin containing specific respective amounts of components P and Q, and optional component R. Such a thermoplastic resin composition has excellent thermal stability, flow properties and moldability, and can confer the molded article with a markedly improved resilience.

Components S and T are compounded in respective amounts, per 100 parts by weight of the resin components suitably formulated from components P, Q and R, of at least 5 parts by weight, preferably at least 10 parts by weight, more preferably at least 15 parts by weight, and most preferably at least 18 parts by weight, but not more than 80 parts by weight, preferably not more than 40 parts by weight, more preferably not more than 25 parts by weight, and most preferably not more than 22 parts by weight, of component S; and at least 0.1 part by weight, preferably at least 0.5 part by weight, more preferably at least 1 part by weight, and most preferably at least 2 parts by weight, but not more than 10 parts by weight, preferably not more than 8 parts by weight, more preferably not more than 6 parts by weight, and most preferably not more than 5 parts by weight, of component T. Too little component S lowers the melt viscosity, resulting in inferior processability, whereas too much lowers the durability. Too little component T fails to improve thermal stability and resilience, whereas too much instead lowers the heat resistance of the thermoplastic resin composition due to the presence of excess basic inorganic metal compound.

In the thermoplastic resin composition which is used to form the mantle having one or more layer in the inventive golf ball and is formulated from the respective above-indicated amounts of the foregoing resin components and components S and T, it is recommended that at least 50 mol %, preferably at least 60 mol %, more preferably at least 70 mol %, and most preferably at least 80 molt, of the acid groups be neutralized. A high degree of neutralization such as this makes it possible to more reliably suppress the exchange reactions that become a problem when only a base resin and a fatty acid or fatty acid derivative are used as in the above-cited prior art, thus preventing the formation of fatty acid. As a result, there is obtained a material of greatly increased thermal stability and good processability which can provide a mantle of much better resilience than prior-art ionomer resins.

"Degree of neutralization," as used above, refers to the degree of neutralization of acid groups present within the mixture of the base resin and the fatty acid or fatty acid derivative serving as component S, and differs from the degree of neutralization of the ionomer resin itself when an ionomer resin is used as the metal ion-neutralized random copolymer in the base resin. A mixture according to the invention having a certain degree of neutralization, when compared with an ionomer resin by itself having the same degree of neutralization, contains a very large number of metal ions. This large number of metal ions increases the density of ionic crosslinks that contribute to improved reactivity, making it possible to confer the molded article with excellent resilience.

To more reliably achieve both a high degree of neutralization and good flow characteristics, it is recommended that the acid groups in the above-described mixture be neutralized with transition metal ions and alkali metal and/or alkaline earth metal ions. Although transition metal ions have a weaker ionic cohesion than alkali metal and alkaline earth metal ions, the combined use of these different types of ions to neutralize acid groups in the mixture can provide a substantial improvement in the flow properties of the thermoplastic resin composition.

The molar ratio between the transition metal ions and the alkali metal and/or alkaline earth metal ions may be adjusted as appropriate. It is recommended that the ratio be within a range of generally 10:90 to 90:10, preferably 20:80 to 80:20, more preferably 30:70 to 70:30, and most preferably 40:60 to 60:40. Too low a molar ratio of transition metal ions may fail to provide sufficient improvement in the flow characteristics of the thermoplastic resin composition. On the other hand, too high a molar ratio may lower the resilience of the mantle molded from the composition.

Specific, non-limiting, examples of the metal ions include zinc ions as the transition metal ions and at least one type of ion selected from among sodium, lithium and magnesium ions as the alkali metal or alkaline earth metal ions.

A known method may be used to obtain a mixture in which the desired amount of acid groups have been neutralized with transition metal ions and alkali metal or alkaline earth metal ions. Specific examples of methods of neutralization with transition metal ions, particularly zinc ions, include the use of zinc soaps as the fatty acid derivative, the use of zinc-neutralized products (e.g., zinc ion-neutralized ionomer resins) when formulating component P and component Q as the base resin, and the use of zinc compounds such as zinc oxide as the basic inorganic metal compound of component T.

In the golf ball of the invention, the above-described thermoplastic resin composition from which the mantle having at least one layer is made may include also suitable amounts of any additives that may be required for the intended use of the material. For example, if the material is to be used as a cover stock, such additives as pigments, dispersants, antioxidants, ultraviolet absorbers and light stabilizers may be added to the essential ingredients described above. When such additives are included in the composition, they may be incorporated in an amount, per 100 parts by weight of the essential ingredients of the composition (the resin components and components S and T), of preferably at least 0.1 part by weight, more preferably at least 0.5 part by weight, and most preferably at least 1 part by weight, but not more than 10 parts by weight, preferably not more than 6 parts by weight, and most preferably not more than 4 parts by weight.

The thermoplastic resin composition may be obtained by preparing a mixture of the above-described essential ingredients and whatever optional ingredients may be needed, then heating and working together the mixture under suitable conditions, such as a heating temperature of 150 to 250° C. and using an internal mixer such as a kneading-type twin-screw extruder, a Banbury mixer or a kneader. Any suitable method may be used without particular limitation to blend various additives with the above-described essential ingredients of the invention. For example, the additives may be combined with the essential ingredients, and heating and mixture of all the ingredients carried out at the same time. Alternatively, the essential ingredients may first be heated and mixed, following which the optional additives may be added and the overall composition subjected to additional heating and mixture.

The thermoplastic resin composition should have a melt flow rate adjusted to ensure flow characteristics that are particularly suitable for injection molding and thus improve moldability. Specifically, it is recommended that the melt flow rate, as measured according to JIS-K7210 at a temperature of 190° C. and under a load of 21.18 N (2.16 kgf), be set to generally at least 0.5 dg/min, preferably at least 1 dg/min, more preferably at least 1.5 dg/min, and even more preferably at least 2 dg/min, but generally not more than 20 dg/min, preferably not more than 10 dg/min, more preferably not more than 5 dg/min, and most preferably not more than 3 dg/min. Too large or small a melt flow rate may result in a marked decline in melt processability.

The above thermoplastic resin composition is preferably characterized also in terms of the relative absorbance in infrared absorption spectroscopy, representing the ratio of absorbance at the absorption peak attributable to carboxylate anion stretching vibrations normally detected at 1530 to 1630 $cm^{-1}$ to the absorbance at the absorption peak attributable to carbonyl stretching vibrations normally detected at 1690 to 1710 $cm^{-1}$. For the sake of clarity, this ratio may be expressed as follows: (absorbance of absorption peak for carboxylate anion stretching vibrations)/(absorbance of absorption peak for carbonyl stretching vibrations).

Here, "carboxylate anion stretching vibrations" refers to vibrations by carboxyl groups from which the proton has dissociated (metal ion-neutralized carboxyl groups), whereas "carbonyl stretching vibrations" refers to vibrations by undissociated carboxyl groups. The ratio between these respective peak intensities depends on the degree of neutralization. In the ionomer resins having a degree of neutralization of about 50 mol % which are commonly used, the ratio between these peak absorbances is about 1:1.

To improve the thermal stability, flow, processability and resilience of the thermoplastic resin composition used in the invention, it is recommended that the composition have a carboxylate anion stretching vibration peak absorbance which is at least 1.3 times, preferably at least 1.5 times, and most preferably at least 2 times, the carbonyl stretching vibration peak absorbance. The absence of any carbonyl stretching vibration peak is especially preferred.

The thermal stability of the thermoplastic resin composition can be measured by thermogravimetry. It is recommended that, in thermogravimetry, the composition have a weight loss at 250° C., based on the weight of the composition at 25° C., of generally not more than 2 wt %, preferably not more than 1.5 wt %, and most preferably not more than 1 wt %.

A known method may be used to form a mantle of at least one layer from the above-described thermoplastic resin composition. The method is not subject to any particular limitation and may be, for example, a process in which a prefabricated core is placed within a mold, and the thermoplastic resin composition, after being heated, mixed and melted, is injection molded about the core. Such a process is highly desirable because it allows production of the golf ball to be carried out in a state where excellent flow properties and moldability are assured. Moreover, the resulting golf ball has a high rebound.

Alternatively, a method may be employed in which the thermoplastic resin composition serving as the mantle-forming material is pre-molded into a pair of hemispherical half-cups, following which the half-cups are placed around the core and molded under applied pressure at 120 to 170° C. for a period of 1 to 5 minutes.

The mantle composed of at least one layer has a thickness per layer of at least 0.5 mm, and preferably at least 0.7 mm, but not more than 2.0 mm, and preferably not more than 1.8 mm. At a thickness per mantle layer of less than 0.5 mm, the presence of a mantle has substantially no effect. On the other hand, a thickness per layer of more than 2.0 mm compromises the feel on impact and the rebound of the ball.

In the mantle having at least one layer, the mantle layer in contact with the cover (outermost layer of the mantle) has a Shore D hardness of at least 20, and preferably at least 25, but not more than 60, and preferably not more than 58. At a Shore D hardness in the outermost layer of the mantle of less than 20, the rebound of the ball decreases. On the other hand, at a Shore D hardness of more than 60, the feel of the golf ball at the time of impact is greatly diminished.

It is critical that the Shore D hardness of the outermost layer of the mantle in the inventive golf ball be no greater than the subsequently described Shore D hardness of the cover. This relationship between the Shore D hardness of the outermost layer of the mantle and the shore D hardness of the cover enables a lower spin and a higher angle of elevation to be achieved in the golf ball. Moreover, when an ionomer resin having a high degree of neutralization is used as the mantle-forming material, a high rebound is also achieved. These effects work together to provide a good carry.

Preferably the mantle consists of an inner layer and an outer layer.

The inventive golf ball has a cover made primarily of a mixture of (F) 100 parts by weight of a resin composition containing an ionomer resin and (G) 5 to 40 parts by weight of an inorganic filler. This mixture is sometimes referred to hereinafter as the "cover stock."

Preferably, component F, the resin composition containing an ionomer resin is primarily comprised of a mixture containing (M) an amino-terminated block polymer and (N) an ionomer resin, in a weight ratio M/N of 3/97 to 60/40.

The amino-terminated block polymer (M) is preferably a crystalline olefin block-bearing block copolymer whose ends have been modified with amino groups.

The crystalline olefin block-bearing block copolymer is preferably one having hard segments composed of crystalline olefin blocks (Co) or crystalline olefin blocks (Co) in combination with crystalline styrene blocks (Cs), and having soft segments composed of blocks of ethylene and butylene with a relatively random copolymeric structure (EB). The use of a block copolymer having a molecular structure with a hard segment at one or both ends, that is, a Co-EB, Co-EB-Co or Cs-EB-Co structure, is preferred. Illustrative examples of the crystalline olefin blocks include crystalline polyethylene blocks and crystalline polypropylene blocks. Crystalline polyethylene blocks are especially preferred.

These block copolymers having crystalline olefin blocks can be prepared by the hydrogenation of a polybutadiene or a styrene-butadiene copolymer.

The polybutadiene or styrene-butadiene copolymer used in hydrogenation is preferably a polybutadiene in which the butadiene structure contains 1,4 polymer blocks which are at least 95 wt % composed of 1,4 units, and the overall butadiene structure has a 1,4 unit content of at least 50 wt %, and preferably at least 80 wt %.

It is especially preferable for the above-described block copolymer having a Co-EB-Co structure to be prepared by the hydrogenation of a polybutadiene in which both ends of the molecular chain are 1,4 polymerization products rich in 1,4 units, and the center portion of which contains a mixture of 1,4 units and 1,2 units.

In cases where the ends of the crystalline olefin block-bearing block copolymer are modified with amino groups, the modification of styrene block ends with amino groups is preferred.

The degree of hydrogenation in the polybutadiene or styrene-butadiene copolymer hydrogenation product, expressed as the percent of double bonds in the polybutadiene or styrene-butadiene copolymer that are converted to saturated bonds, is preferably 60 to 100%, and most preferably 90 to 100%. Too low a degree of hydrogenation may lead to deterioration such as gelation when blended with the ionomer resin and other components. Moreover, the cover in the completed golf ball may have a poor weather resistance and a poor durability to impact.

In the above block copolymers having crystalline olefin blocks, the hard segment content is preferably 10 to 50 wt %. A hard segment content which is too high may result in a poor flexibility that keeps the objects of the invention from being effectively achieved, whereas a hard segment content which is too low may compromise the moldability of the blend.

This crystalline olefin block-bearing block copolymer has a number-average molecular weight of preferably 30,000 to 800,000.

The above-described block copolymer has a melt index at 230° C. of preferably 0.5 to 15 g/10 min, and most preferably 1 to 7 g/10 min. Outside of this range, problems such as weld lines, sink marks and short shots may arise during injection molding.

The ionomer resin (N) used in the invention includes any ionomer resins that have hitherto been employed in cover stocks for golf balls. Preferably, the ionomer resin (N) is one containing both:

(N-1) an olefin/unsaturated carboxylic acid binary random copolymer and/or a metal ion neutralization product of an olefin/unsaturated carboxylic acid binary random copolymer, and (N-2) an olefin/unsaturated carboxylic acid/unsaturated carboxylic acid ester ternary random copolymer and/or a metal ion neutralization product of an olefin/unsaturated carboxylic acid/unsaturated carboxylic acid ester ternary random copolymer.

α-Olefins may be suitably used as the olefins in components N-1 and N-2. Specific examples of suitable α-olefins include ethylene, propylene and 1-butene. Of these, ethylene is especially preferred. A plurality of these olefins may be used in combination.

α,β-Unsaturated carboxylic acids having 3 to 8 carbons may be suitably used as the unsaturated carboxylic acids in components N-1 and N-2. Specific examples of suitable α,β-unsaturated carboxylic acids having 3 to 8 carbons include acrylic acid, methacrylic acid, ethacrylic acid, itaconic acid, maleic acid and fumaric acid. Of these, acrylic acid and methacrylic acid are preferred. A plurality of these unsaturated carboxylic acids may be used in combination.

Lower alkyl esters of the above unsaturated carboxylic acids are suitable as the unsaturated carboxylic acid ester in component N-2. Examples includes those obtained by reacting a lower alcohol such as methanol, ethanol, propanol, n-butanol or isobutanol with the above unsaturated carboxylic acids. Acrylic acid esters and methacrylic acid esters are especially preferred.

Suitable examples of the unsaturated carboxylic acid ester in component N-2 include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred. A plurality of these unsaturated carboxylic acid esters may be used in combination.

When the above olefin/unsaturated carboxylic acid copolymer or olefin/unsaturated carboxylic acid/unsaturated carboxylic acid ester copolymer is prepared, other monomers may optionally be copolymerized therewith, provided this does not compromise the objects of the invention.

The content of unsaturated carboxylic acid within these copolymers is preferably 5 to 20 wt % in component N-1 and preferably 1 to 10 wt % in component N-2. If the unsaturated carboxylic acid content is too low, the rigidity and resilience of the cover become small, which may lower the flight characteristics of the golf ball. On the other hand, a content of unsaturated carboxylic acid which is too high may result in a cover of inadequate flexibility.

The content of unsaturated carboxylic acid ester in component N-2 is preferably 12 to 45 wt %. If the unsaturated carboxylic acid ester content is too low, a softening effect may not be achieved, whereas if it is too high, the resilience of the cover may decrease.

When above components N-1 and N-2 are blended together, it is desirable for them to be used in a weight ratio (N-1)/(N-2) of preferably 100/0 to 25/75, and most preferably 100/0 to 50/50. The addition of too much component N-2 may result in an inadequate resilience.

The ionomer resin N used in the invention is preferably one obtained by neutralizing the above-described copolymers with metal ions having a valence of 1 to 3. Examples of metal ions with a valence of 1 to 3 that are suitable for neutralization include $Na^+$, $K^+$, $Li^+$, $Mg^{2+}$, $Ca^{2+}$, $Zn^{2+}$, $Al^{3+}$, $Fe^{2+}$ and $Fe^{3+}$.

Such metal ions can be introduced by reacting the above-described copolymer with, for example, a hydroxide, methoxide, ethoxide, carbonate, nitrate, formate, acetate or oxide of the above metal having a valence of 1 to 3.

It is advantageous for the degree of neutralization of the carboxylic acid included within the above-described copolymer to be such that at least 10 mol %, preferably at least 30 molt, and up to 100 mol %, preferably up to 90 mol %, of the carboxylic acid groups on the copolymer are neutralized with metal ions. A low degree of neutralization may result in a low resilience.

To improve resilience, it is desirable for a monovalent metal ionomer and a divalent metal ionomer to be mixed and used together, preferably such that the weight ratio of the monovalent metal ionomer to the divalent metal ionomer is from 20/80 to 80/20.

It is known that blending together suitable amounts of ionomer resins containing different monovalent, divalent or trivalent metal ions enables a balance to be achieved between the resilience and durability of a layer composed primarily of ionomer resin. Blending in this way is desirable in the present invention as well.

The ionomer resin N used in the invention may be a commercial product, illustrative examples of which include Surlyn (produced by E.I. DuPont de Nemours and Company) and Himilan (produced by DuPont-Mitsui Polychemicals Co., Ltd.).

In the practice of the invention, the amino-terminated block polymer (M) and the ionomer resin (N) are blended in proportions, based on a combined amount of 100 parts by weight, of 3 to 60 parts by weight, preferably 10 to 60 parts by weight, and most preferably 20 to 45 parts by weight, of component M; and 40 to 97 parts by weight, preferably 40 to 90 parts by weight, and most preferably 55 to 80 parts by weight of component N. The inclusion of too little component M fails to provide adequate softening of the ionomer resin, as a result of which sufficient improvement in the feel and controllability of the ball are not achieved. On the other hand, too much component M compromises the cut resistance of the cover.

Component G, inorganic filler used in the cover stock may be selected from the same materials described above for component E. Among others, barium sulfate is most preferred because it is most effective for improving durability to cracking.

The amount of barium sulfate is preferably at least 5 parts, more preferably at least 7 parts, even more preferably at least 10 parts, and most preferably at least 13 parts by weight, but not more than 40 parts, more preferably not more than 30 parts, even more preferably not more than 25 parts, and most preferably not more than 20 parts by weight, per 100 parts by weight of the ionomer resin-containing resin composition (F). Too much amounts may detract from the crack durability of the cover whereas too less amounts may fail to provide desired flight characteristics.

If necessary, the cover stock used in the invention may have added thereto various additives, such as pigments, dispersants, antioxidants, ultraviolet absorbers, and light stabilizers, insofar as the objects of the invention are achievable.

The amount of such additives included in the cover stock, per 100 parts by weight of the ionomer resin-containing resin composition (F), is generally 0.1 to 50 parts by weight, preferably 0.5 to 30 parts by weight, and more preferably 1 to 6 parts by weight. The use of too much additive may lower the durability of the cover, whereas the use of too little may fail to achieve the desired effects of those additives.

The cover obtained from the above-described cover stock has a Shore D hardness of at least 50, and preferably at least 53, but not more than 70, and preferably not more than 64. A Shore D hardness which is too low compromises the rebound of the ball, whereas a Shore D hardness which is too high fails to provide an improved feel and controllability. "Shore D hardness," as used herein, refers to the hardness measured with a type D durometer as described in ASTM D2240.

The cover stock generally has a density of 1.00 to 1.30 g/cm³, preferably 1.00 to 1.25 g/cm³, and more preferably 1.05 to 1.20 g/cm³.

The method of preparing the above-described cover stock is not subject to any particular limitation. For example, the cover stock may be obtained by working together the above components under applied heat at 150 to 250° C. using an internal mixer such as a kneading-type twin-screw extruder, a Banbury mixer or a kneader.

When various additives are included in the cover stock together with above components F and G, any suitable method of incorporation may be used. That is, the additives may be blended together with components F and G, and heated and mixed at the same time. Alternatively, components F and G may first be heated and mixed, then the desired additives added, followed by further heating and mixing.

The above-described cover stock provides a cover of excellent resilience and cracking durability.

Combining the soft core and the cover described above enables the hardness of the golf ball to be lowered without sacrificing carry, thus achieving a soft feel upon impact. Moreover, because the golf ball has a lower hardness, the contact surface area between the club and the golf ball at the time of impact increases, dispersing the force of impact when the ball is hit and thus further enhancing the scuff resistance and cracking durability of the ball.

The multi-piece solid golf balls of the invention are composed of the above-described core, a mantle of at least one layer which is made of the above-described thermoplastic resin composition and encloses the core, and a cover which is made of the above-described cover stock and encloses the mantle.

As with the formation of the mantle, the method used to form the cover may be one known to the art and is not subject to any particular limitation. For example, use may be made of a method in which a mantle-covered core is placed within a mold and the cover stock, after being heated, mixed and melted, is injection molded about the mantle-covered core. Such a process is desirable both because it allows production of the golf ball to be carried out in a state where excellent flow properties and moldability are assured, and because the resulting golf ball has a high rebound.

Alternatively, a method may be employed in which the cover stock of the invention is pre-molded into a pair of hemispherical half-cups, following which the half-cups are placed around the mantle-covered core and molded under applied pressure at 120 to 170° C. for a period of 1 to 5 minutes.

To ensure flow characteristics which are particularly suitable for injection molding and to improve the moldability, it is desirable to adjust the melt flow rate of the above-described cover stock. Specifically, it is recommended that the melt flow rate, as measured in accordance with JIS-K6760 at a temperature of 190° C. and under a load of 21.18 N (2.16 kgf), be generally at least 0.5 dg/min, preferably at least 1 dg/min, more preferably at least 1.5 dg/min, and most preferably at least 2.0 dg/min, but generally not more than 20 dg/min, preferably not more than 10 dg/min, more preferably not more than 5 dg/min, and most preferably not more than 3 dg/min. If the cover stock has too large or too small a melt flow rate, the melt processability may decrease markedly.

The cover formed from the cover stock has a thickness of at least 0.5 mm, preferably at least 0.9 mm, and most preferably at least 1.1 mm, but not more than 2.5 mm and preferably not more than 2.0 mm. A cover which is too thick has a diminished resilience, whereas one that is too thin has a poor durability.

In the multi-piece solid golf ball of the invention, it is desirable for the surface of the cover to have numerous dimples formed thereon, and for the cover to be administered various treatment such as surface preparation, stamping and painting. The arrangement of the dimples is preferably such that a great circle which intersects no dimples cannot be traced on the surface of the golf ball. The existence of even one great circle which does not intersect any dimples may give rise to variability in the flight of the ball.

It is preferable for the number of dimple types and the total number of dimples to be optimized. Synergistic effects arising from optimization of the number of dimple types and the total number of dimples enables a golf ball to be achieved which has a more stable trajectory and a better overall flight performance, including carry.

The number of dimple types refers herein to the number of types of dimples of mutually differing diameter and/or depth. It is recommended that this number of dimple types be generally at least two, and preferably at least three, but not more than eight, and preferably not more than six.

It is also recommended that the total number of dimples on the surface of the golf ball be generally at least 300, and preferably at least 320, but not more than 480, and preferably not more than 455. A total number of dimples that is too low or too high may prevent the optimal amount of lift from being achieved, resulting in a shorter carry.

It is recommended that the golf ball of the invention have an optimized dimple volume occupancy VR and an optimized dimple surface coverage SR, both of which are expressed in percent. These parameters VR and SR, when both optimized, act synergistically to improve the trajectory of the ball and increase its carry, and also help the ball achieve a proper balance between lift and drag, thus making it possible to provide a better overall flight performance.

The dimple volume occupancy VR is defined as the ratio of the sum of the volumes of individual dimples on the surface of the golf ball to the volume of a hypothetical sphere represented by the surface of the golf ball were it to have no dimples, and is expressed in percent. The multi-piece solid golf ball of the invention has a VR value of generally at least 0.70%, and preferably at least 0.75%, but generally not more than 1.00%, preferably not more than 0.82%, and most preferably not more than 0.79%.

The dimple surface coverage SR is defined as the ratio of the sum of the surface areas of individual dimples, each dimple surface area being circumscribed by an edge of the dimple, to the surface area of the same hypothetical sphere as described above, and is likewise expressed in percent. The inventive golf ball has an SR value of generally at least 70%, and preferably at least 72%, but generally not more than 85%, and preferably not more than 83%.

A VR value or SR value outside of the above respective ranges may prevent an optimal trajectory from being achieved and thus lower the carry of the ball.

The combination of the above-described solid core and cover with the foregoing relatively high-trajectory dimples helps prevent the ball from dropping at too steep an angle and enables the carry of the ball to be extended in a higher and flatter trajectory.

The above-described dimple volume occupancy VR and dimple surface coverage SR are values obtained from measurements of dimples on a fully manufactured golf ball. For example, when the surface of the ball is subjected to finishing treatment (e.g., painting, stamping) after the cover has been formed, VR and SR are calculated based on the shape of the dimples on the manufactured ball once all such treatment has been completed.

The multi-piece solid golf ball of the invention can be manufactured in accordance with the Rules of Golf for use in competitive play, in which case the ball may be formed to a diameter of not less than 42.67 mm and a weight of at least 45.0 g, preferably at least 45.2 g, and not more than 45.93 g.

The multi-piece solid golf ball of the invention, which is constructed of the above-described core, mantle and cover and which preferably bears numerous dimples on the surface of the cover thereon, has a deflection when subjected to a load of 980 N (100 kgf) of at least 3.0 mm, preferably at least 3.2 mm, more preferably at least 3.4 mm, and most preferably at least 3.6 mm, but not more than 5.5 mm, preferably not more than 5.0 mm, more preferably not more than 4.8 mm, even more preferably not more than 4.6 mm, and most preferably not more than 4.4 mm. At a deflection of less than 3.0 mm, the feel upon impact is poor. Moreover, particularly on long shots with a driver or the like in which the ball undergoes large deformation, the ball takes on too much spin and fails to travel as far. On the other hand, at a deflection of more than 5.5 mm, the ball has a less lively feel and does not exhibit sufficient rebound, resulting in a shorter carry. Moreover, it has a poor durability to cracking with repeated impact.

EXAMPLES

The following examples and comparative examples are given by way of illustration and not by way of limitation.

Examples 1 to 3, Comparative Examples 1 to 3

Solid cores were produced by using the rubber compositions shown in Table 1 and vulcanizing at 155° C. for 17 minutes.

In each example, a mantle-forming material of the composition shown in Table 2 was mixed in a kneading-type twin-screw extruder at 200° C. to form the mantle material in pelletized form. This material was then injected into a mold in which the above solid core had been placed, thereby producing a mantle-covered solid core.

A material of the composition shown in Table 3 was 1mixed at 200° C. in a kneading-type twin-screw extruder to form a cover stock in pelletized form. The cover stock was then injected into a mold in which the above mantle-covered solid core had been placed, thereby producing a multi-piece solid golf ball.

Figure 2:
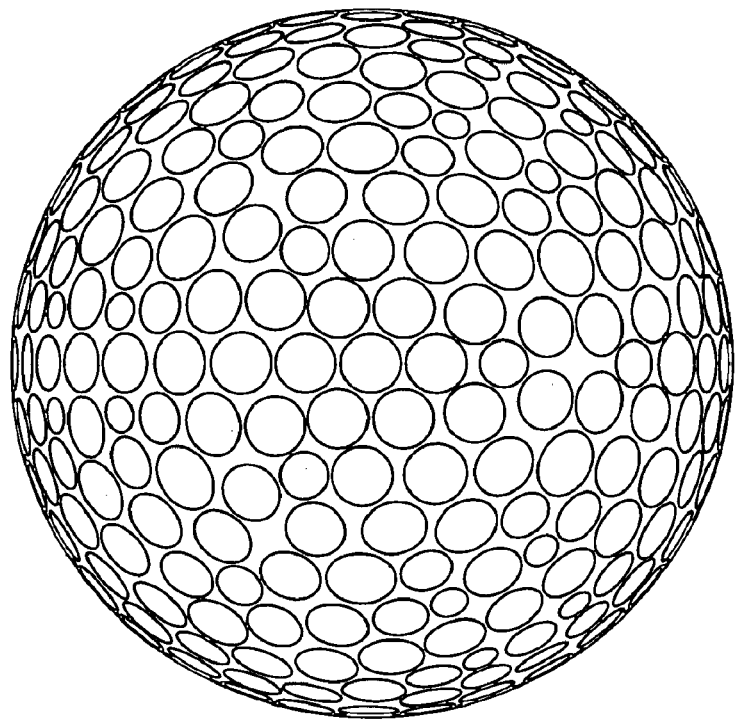
FIG. 2 shows exemplary arrangements of dimples of set B in Table 4 on golf balls.
Figure 2:
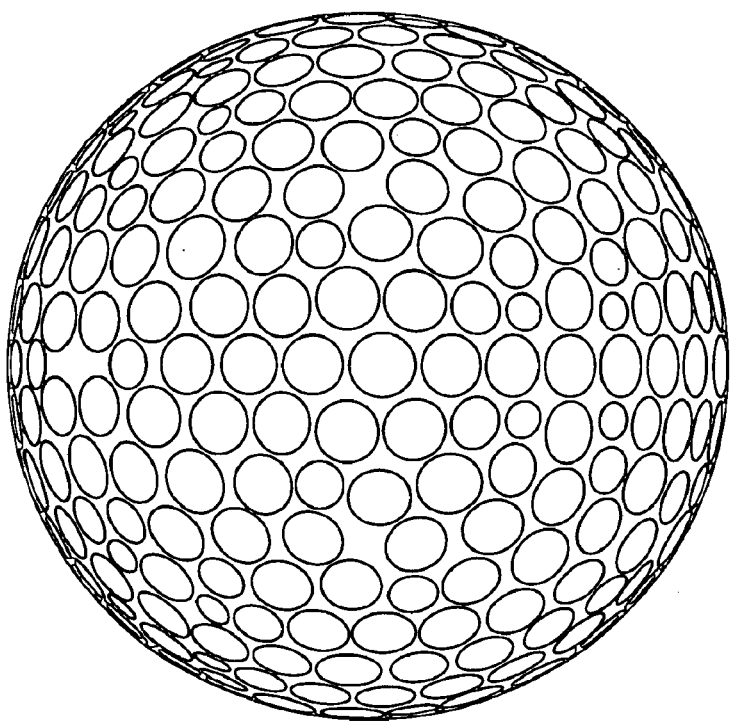

Details concerning the combination of dimples arranged on the surface of the cover in each example are shown in Table 4. FIGS. 1 and 2 show various arrangements of dimples of sets A to C given in Table 4.

Table 5 presents the characteristics of the respective golf balls obtained in these examples.

TABLE 1

| | | Core | | | | | |
|---|---|---|---|---|---|---|---|
| | | | | | | Comparative | |
| | Ingredients | Example | | | Example | | |
| | (parts by weight) | 1 | 2 | 3 | 1 | 2 | 3 |
| Base rubber | HCBN-13 | 100 | 100 | 100 | | | |
| | BR01 | | | | 50 | 50 | 50 |
| | BR11 | | | | 50 | 50 | 50 |
| Organic peroxide | Perhexa 3M-40 | 0.3 | 0.3 | 0.3 | 0.6 | 0.6 | 0.6 |
| | Percumil D | 0.3 | 0.3 | 0.3 | 0.6 | 0.6 | 0.6 |
| Unsaturated carboxylic acid metal salt | Zinc acrylate | 22.1 | 22.1 | 19.0 | 20.0 | 20.0 | 26.5 |
| Organic sulfur compound | Zinc salt of pentachlorothiophenol | 1.0 | 1.0 | 1.0 | 1.0 | 1.0 | 1.0 |
| Inorganic filler | Zinc oxide | 26.0 | 26.0 | 27.2 | 32.2 | 32.2 | 29.7 |
| Antioxidant | Nocrac NS-6 | 0.1 | 0.1 | 0.1 | 0.1 | 0.1 | 0.1 |

HCBN-13: Produced by JSR Corporation. Cis-1,4 content, 96%. Mooney viscosity ($ML_{1+4}$ (100° C.)), 53. Polydispersity Mw/Mn, 3.2. Catalyst, neodymium.
BR01: Produced by JSR Corporation. Cis-1,4 content, 96%. Mooney viscosity ($ML_{1+4}$ (100° C.)), 44. Polydispersity Mw/Mn, 4.2. Catalyst, nickel. Solution viscosity, 150 mPa · s.
BR11: Produced by JSR Corporation. Cis-1,4 content, 96%. Mooney viscosity ($ML_{1+4}$ (100° C.)), 44. Polydispersity Mw/Mn, 4.1. Catalyst, nickel. Solution viscosity, 270 mPa · s.
Perhexa 3M-40: Produced by NOF Corporation. Perhexa 3M-40 is a 40% dilution. The amount of addition indicated is the effective weight of the 1,1-bis(t-butylperoxy)-3,3,5-trimethylcyclohexane added.
Percumil D: Produced by NOF Corporation. Dicumyl peroxide.
Zinc Acrylate: Produced by Nihon Joryu Kogyo K. K.
Zinc Salt of Pentachlorothiophenol: Produced by Tokyo Kasei Kogyo Co., Ltd.
Zinc Oxide: Produced by Sakai Chemical Industry Co., Ltd.
Nocrac NS-6: 2,2'-Methylenebis(4-methyl-6-t-butylphenol) produced by Ouchi Shinko Chemical Industry Co., Ltd.

TABLE 2

| Ingredients | Mantle | | | | | |
|---|---|---|---|---|---|---|
| | Example | | | Comparative Example | | |
| (parts by weight) | 1 | 2 | 3 | 1 | 2 | 3 |
| Himilan 1601 | | 65 | 65 | | 65 | 65 |
| Surlyn 8120 | 75 | | | 75 | | |
| Dynaron 6100P | 25 | 35 | 35 | 25 | 35 | 35 |
| Behenic acid | 20 | 20 | 20 | | | |
| Calcium hydroxide | 2.3 | 2.2 | 2.2 | | | |

Himilan 1601: A sodium ion-neutralized ethylene/methacrylic acid copolymer ionomer produced by DuPont-Mitsui Polychemicals Co., Ltd.
Surlyn 8120: An ionomer resin produced by E.I. DuPont de Nemours and Company.
Dynaron 6100P: A crystalline olefin block-bearing block copolymer produced by JSR Corporation.
Behenic acid: Produced by NOF Corporation.

TABLE 3

| Ingredients | Cover | | | | | |
|---|---|---|---|---|---|---|
| | Example | | | Comparative Example | | |
| (parts by weight) | 1 | 2 | 3 | 1 | 2 | 3 |
| Surlyn 7930 | 65 | 50 | | | 60 | 60 |
| Surlyn 6320 | 35 | 50 | | | 35 | 35 |
| Himilan 1605 | | | 40 | | | |
| Himilan 1706 | | | 40 | | | |
| HSB 1561 | | | 20 | | | |
| Himilan 1557 | | | | 52 | | |
| Himilan 1601 | | | | 48 | | |
| Nucrel 9-1 | | | | | 5 | 5 |
| Barium Sulfate 300 | 15 | 15 | | | | |
| Titanium dioxide | 5 | 5 | | 2 | 2 | 2 |

Surlyn 7930: An ionomer resin produced by E. I. DuPont de Nemours and Company.
Surlyn 6320: An ionomer resin produced by E. I. DuPont de Nemours and Company.
Himilan 1605: A sodium ion-neutralized ethylene/methacrylic acid copolymer ionomer produced by DuPont-Mitsui Polychemicals Co., Ltd.
Himilan 1706: A zinc ion-neutralized ethylene/methacrylic acid copolymer ionomer produced by DuPont-Mitsui Polychemicals Co., Ltd.
HSB 1561: An amino-terminated block copolymer. This is a Cs-EB-Co type hydrogenated triblock polymer obtained by modifying the ends of the styrene blocks with amino groups.
Himilan 1557: A zinc ion-neutralized ethylene/methacrylic acid copolymer ionomer produced by DuPont-Mitsui Polychemicals Co., Ltd.

TABLE 3-continued

| Ingredients | Cover | | | | | |
|---|---|---|---|---|---|---|
| | Example | | | Comparative Example | | |
| (parts by weight) | 1 | 2 | 3 | 1 | 2 | 3 |

Himilan 1601: A sodium ion-neutralized ethylene/methacrylic acid copolymer ionomer produced by DuPont-Mitsui Polychemicals Co., Ltd.
Nucrel 9-1: A ternary acid copolymer produced by E.I. DuPont de Nemours and Company.
Barium Sulfate 300: Sakai Chemical Industry Co., Ltd.

TABLE 4

| | | Dimple Set | | |
|---|---|---|---|---|
| | | A | B | C |
| Total number of dimples | | 432 | 398 | 432 |
| VR (%) | | 0.81 | 0.92 | 1.03 |
| SR (%) | | 78.6 | 74.5 | 78.6 |
| Number of differing types of dimples | | 3 | 4 | 3 |
| Dimple 1 | Diameter | 3.9 | 4.1 | 3.9 |
| | Depth | 0.16 | 0.19 | 0.2 |
| | Number | 300 | 48 | 300 |
| Dimple 2 | Diameter | 3.4 | 3.8 | 3.4 |
| | Depth | 0.13 | 0.18 | 0.17 |
| | Number | 60 | 254 | 60 |
| Dimple 3 | Diameter | 2.6 | 3.2 | 2.6 |
| | Depth | 0.10 | 0.16 | 0.14 |
| | Number | 72 | 72 | 72 |
| Dimple 4 | Diameter | | 2.4 | |
| | Depth | | 0.12 | |
| | Number | | 24 | |

VR: The ratio in percent of the sum of the individual spatial volumes for each dimple below a planar surface circumscribed by an edge of the dimple to the total volume of a hypothetical sphere represented by the surface of the golf ball were it to have no dimples.
SR: The ratio in percent of the sum of the individual surface areas for each dimple circumscribed by a dimple edge on a hypothetical sphere were the golf ball to have no dimples to the surface area of the hypothetical sphere.

TABLE 5

| Ingredients | | Example | | | Comparative Example | | |
|---|---|---|---|---|---|---|---|
| (parts by weight) | | 1 | 2 | 3 | 1 | 2 | 3 |
| Core | Diameter (mm) | 36.4 | 36.4 | 36.4 | 36.4 | 36.4 | 36.4 |
| | Hardness (mm) | 4.8 | 4.8 | 5.3 | 4.8 | 4.8 | 3.5 |
| Mantle | Thickness (mm) | 1.65 | 1.65 | 1.65 | 1.65 | 1.65 | 1.65 |
| | Hardness | 51.0 | 53.0 | 53.0 | 51.0 | 53.0 | 53.0 |
| Cover | Thickness (mm) | 1.5 | 1.5 | 1.5 | 1.5 | 1.5 | 1.5 |
| | Resin density (g/cm$^3$) | 1.08 | 1.08 | 1.08 | 0.96 | 0.99 | 0.99 |
| | Hardness | 60 | 57 | 60 | 60 | 57 | 57 |
| | Dimple set | A | A | B | A | C | A |
| Ball characteristics | Diameter (mm) | 42.7 | 42.7 | 42.7 | 42.7 | 42.7 | 42.7 |
| | Weight (g) | 45.3 | 45.3 | 45.3 | 45.3 | 45.3 | 45.3 |
| | Hardness (mm) | 3.7 | 3.7 | 3.9 | 3.7 | 3.7 | 2.8 |
| Flight Performance | Initial velocity (m/s) | 58.3 | 58.4 | 58.4 | 57.8 | 57.9 | 58.4 |
| | Spin (rpm) | 2580 | 2650 | 2550 | 2620 | 2640 | 3000 |
| | Carry (m) | 183.0 | 184.0 | 183.0 | 179.5 | 175.0 | 183.5 |
| | Total distance (m) | 210.0 | 209.5 | 210.5 | 206.5 | 203.5 | 207.0 |
| Feel | Driver | soft | soft | soft | soft | soft | hard |
| | Putter | soft | soft | soft | soft | soft | hard |

TABLE 5-continued

| Ingredients | Example | | | Comparative Example | | |
|---|---|---|---|---|---|---|
| (parts by weight) | 1 | 2 | 3 | 1 | 2 | 3 |
| Scuff resistance | OK | OK | OK | OK | OK | NG |
| Crack durability | OK | OK | OK | NG | NG | OK |

Core Diameter (mm): The average of measurements taken at five different places on the surface of the core.
Core Hardness (mm): The deflection of the core when subjected to a load of 980 N (100 kgf).
Mantle Thickness (mm): Calculated as [(diameter of mantle-covered core) − (core diameter)] ÷ 2.
Mantle Hardness: Shore D hardness, as measured in accordance with ASTM D-2240.
Cover Thickness (mm): Calculated as [(ball diameter) − (diameter of mantle-covered core)] ÷ 2.
Cover resin density (g/cm$^3$): measured in accordance with JIS K-6760.
Cover Hardness: Shore D hardness, as measured in accordance with ASTM D-2240.
Ball Diameter (mm): The average of measurements taken at five different non-dimple places.
Ball Hardness (mm): The deflection of the ball when subjected to a load of 980 N (100 kgf).
Flight Performance: The initial velocity, spin rate, carry and total distance for each golf ball were measured when the ball was struck at a head speed of 40 m/s with a driver (W#1) mounted on a swing machine made by Miyamae Co., Ltd.
Feel: The feel of each ball when hit with a driver (W#1) and a putter was rated by five top-caliber amateur golfers as "Soft," "Ordinary," or "Hard." The rating assigned most often to a particular ball was used as that ball's overall rating.
Scuff Resistance: The ball was temperature conditioned to 23° C., then hit at a head speed of 33 m/s with a pitching wedge mounted on a swing machine. After being hit, the ball was examined visually for signs of damage. The scuff resistance was rated as follows.
OK: Damage was not observed, or was of such a limited degree as to pose no impediment to further use of the ball.
NG: Considerable damage, such as surface scuffing and loss of dimples.
Crack durability: The ball was repeatedly hit at a head speed of 40 m/s with a driver (W#1) mounted on a swing machine (Miyamae Co., Ltd.). After being hit, the ball was examined visually for signs of damage, along with a reference ball ("Altus Newing" by Bridgestone Sports Co., Ltd.). The durability was rated as follows.
OK: Cracked later than the reference ball.
NG: Cracked before the reference ball.

As described above and demonstrated in the foregoing examples, the multi-piece solid golf balls of this invention have a combination of outstanding flight performance and soft feel on impact with excellent scuff resistance and crack durability, that is unprecedented.

Japanese Patent Application No. 2002-349213 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

We claim:

1. A multi-piece solid golf ball comprising a solid core, a mantle of at least one layer, and a cover, wherein
the solid core is made of a rubber composition comprising (A) 100 parts by weight of a base rubber that contains 60 to 100 wt % of a polybutadiene of at least 60% cis-1,4 structure and synthesized using a rare-earth catalyst, (B) 0.1 to 0.8 part by weight of an organic peroxide, (C) an unsaturated carboxylic acid or an unsaturated carboxylic acid metal salt or both, (D) an organic sulfur compound selected from the group consisting of thiophenols, thionaphthols, halogenated thiophenols, and metal salts thereof, and (E) an inorganic filler, has a deflection when subjected to a load of 980 N (100 kgf) of 3.5 to 6.5 mm, and has a diameter of 30 to 40 mm;
the mantle of at least one layer is made of a thermoplastic resin composition, has a thickness per layer of 0.5 to 2.0 mm, and includes an outermost layer which is in contact with the cover and has a Shore D hardness of 20 to 60;
the cover is made primarily of a mixture of (F) 100 parts by weight of a resin composition containing an ionomer resin and (G) 5 to 40 parts by weight of an inorganic filler, has a thickness of 0.5 to 2.5 mm and a Shore D hardness of 50 to 70, and satisfies the condition (Shore D hardness of mantle outermost layer)≦(Shore D hardness of cover); and
the golf ball has a deflection when subjected to a load of 980 N (100 kgf) of 3.0 to 5.5 mm.

2. The golf ball of claim 1, wherein the polybutadiene is a modified polybutadiene prepared by synthesis using a neodymium catalyst, followed by reaction with a terminal modifier.

3. The golf ball of claim 1, wherein the rubber composition comprises:
(A) 100 parts by weight of a base rubber containing 60 to 100 wt % of a polybutadiene of at least 60% cis-1,4 structure and synthesized using a rare-earth catalyst,
(B) at least two kinds of organic peroxide,
(C) 10 to 60 parts by weight of an unsaturated carboxylic acid or an unsaturated carboxylic acid metal salt or both,
(D) 0.1 to 5 parts by weight of the organic sulfur compound, and
(E) 5 to 80 parts by weight of an inorganic filler.

4. The golf ball of claim 1, wherein the thermoplastic resin composition of which the mantle is made comprises:
100 parts by weight of resin components which include a base resin of (P) an olefin/unsaturated carboxylic acid binary random copolymer or a metal ion neutralization product of an olefin/unsaturated carboxylic acid binary random copolymer or both in admixture with (Q) an olefin/unsaturated carboxylic acid/unsaturated carboxylic acid ester ternary random copolymer or a metal ion neutralization product of an olefin/unsaturated carboxylic acid/unsaturated carboxylic acid ester ternary random copolymer or both in a weight ratio P/Q of 100:0 to 25:75, and (R) a non-ionomeric thermoplastic elastomer in a weight ratio (P+Q)/R of 100:0 to 50:50;

(S) 5 to 80 parts by weight of a fatty acid or fatty acid derivative having a molecular weight of 280 to 1,500, or both; and (T) 0.1 to 10 parts by weight of a basic inorganic metal compound capable of neutralizing un-neutralized acid groups in the base resin and component S.

5. The golf ball of claim 1, wherein the mantle consists of an inner layer and an outer layer.

6. The golf ball of claim 1, wherein component F, the resin composition containing an ionomer resin is composed primarily of a mixture of (M) an amino-terminated block polymer and (N) an ionomer resin in a weight ratio M/N of 3/97 to 60/40.

7. The golf ball of claim 1, wherein the cover is composed primarily of a mixture of (F) 100 parts by weight of a resin composition containing an ionomer resin and (G) 5 to 30 parts by weight of barium sulfate.

8. The golf ball of claim 1, wherein the cover bears on a surface thereof a plurality of dimples, each dimple having a spatial volume below a planar surface circumscribed by an edge of the dimple and having a surface area circumscribed by the dimple edge on a hypothetical sphere represented by the surface of the golf ball cover were it to have no dimples; which golf ball has a dimple volume occupancy VR, defined as the ratio of the sum of the individual dimple volumes to the volume of the hypothetical sphere, of 0.70 to 1.00%, and a dimple surface coverage SR, defined as the ratio of the sum of the individual dimple surface areas to the surface area of the hypothetical sphere, of 70 to 85%.

9. The golf ball of claim 1, having a weight of 45.0 to 45.93 g.

10. A multi-piece solid golf ball comprising a solid core, a mantle of at least one layer, and a cover, wherein the solid core is made of a rubber composition comprising (A) 100 parts by weight of a base rubber that contains 60 to 100 wt % of a polybutadiene of at least 60% cis-1,4 structure and synthesized using a rare-earth catalyst, (B) 0.1 to 0.8 part by weight of at least two kinds of an organic peroxide, (C) 10 to 60 parts by weight of an unsaturated carboxylic acid or an unsaturated carboxylic acid metal salt or both, (D) 0.1 to 5 parts by weight of an organic sulfur compound and (E) 5 to 80 parts by weight of an inorganic filler, has a deflection when subjected to a load of 980 N (100 kgf) of 3.5 to 6.5 mm, and has a diameter of 30 to 40 mm;

the mantle of at least one layer is made of a thermoplastic resin composition, has a thickness per layer of 0.5 to 2.0 mm, and includes an outermost layer which is in contact with the cover and has a Shore D hardness of 20 to 60;

the cover is made primarily of a mixture of (F) 100 parts by weight of a resin composition containing an ionomer resin and (G) 5 to 40 parts by weight of an inorganic filler, has a thickness of 0.5 to 2.5 mm and a Shore D hardness of 50 to 70, and satisfies the condition (Shore D hardness of mantle outermost layer)≦(Shore D hardness of cover); and the golf ball has a deflection when subjected to a load of 980 N (100 kgf) of 3.0 to 5.5 mm.

11. A multi-piece solid golf ball comprising a solid core, a mantle of at least one layer, and a cover, wherein the solid core is made of a rubber composition comprising (A) 100 parts by weight of a base rubber that contains 60 to 100 wt % of a polybutadiene of at least 60% cis-1,4 structure and synthesized using a rare-earth catalyst, (B) 0.1 to 0.8 part by weight of an organic peroxide, (C) an unsaturated carboxylic acid or an unsaturated carboxylic acid metal salt or both, (D) an organic sulfur compound and (E) an inorganic filler, has a deflection when subjected to a load of 980 N (100 kgf) of 3.5 to 6.5 mm, and has a diameter of 30 to 40 mm;

the mantle of at least one layer is made of a thermoplastic resin composition, has a thickness per layer of 0.5 to 2.0 mm, and includes an outermost layer which is in contact with the cover and has a Shore D hardness of 20 to 60;

the cover is made primarily of a mixture of (F) 100 parts by weight of a resin composition containing an ionomer resin and (G) 5 to 40 parts by weight of an inorganic filler, has a thickness of 0.5 to 2.5 mm and a Shore D hardness of 50 to 70, and satisfies the condition (Shore D hardness of mantle outermost layer) (Shore D hardness of cover); and the golf ball has a deflection when subjected to a load of 980 N (100 kgf) of 3.0 to 5.5 mm, wherein the thermoplastic resin composition of which the mantle is made comprises:

100 parts by weight of resin components which include a base resin of (P) an olefin/unsaturated carboxylic acid binary random copolymer or a metal ion neutralization product of an olefin/unsaturated carboxylic acid binary random copolymer or both in admixture with (Q) an olefin/unsaturated carboxylic acid/unsaturated carboxylic acid ester ternary random copolymer or a metal ion neutralization product of an olefin/unsaturated carboxylic acid/unsaturated carboxylic acid ester ternary random copolymer or both in a weight ratio P/Q of 100:0 to 25:75, and (R) a non-ionomeric thermoplastic elastomer in a weight ratio (P+Q)/R of 100:0 to 50:50;

(S) 5 to 80 parts by weight of a fatty acid or fatty acid derivative having a molecular weight of 280 to 1,500, or both; and (T) 0.1 to 10 parts by weight of a basic inorganic metal compound capable of neutralizing un-neutralized acid groups in the base resin and component S.

12. A multi-piece solid golf ball comprising a solid core, a mantle of at least one layer, and a cover, wherein the solid core is made of a rubber composition comprising (A) 100 parts by weight of a base rubber that contains 60 to 100 wt % of a polybutadiene of at least 60% cis-1,4 structure and synthesized using a rare-earth catalyst, (B) 0.1 to 0.8 part by weight of an organic peroxide, (C) an unsaturated carboxylic acid or an unsaturated carboxylic acid metal salt or both, (D) an organic sulfur compound and (E) an inorganic filler, has a deflection when subjected to a load of 980 N (100 kgf) of 3.5 to 6.5 mm, and has a diameter of 30 to 40 mm;

the mantle of at least one layer is made of a thermoplastic resin composition, has a thickness per layer of 0.5 to 2.0 mm, and includes an outermost layer which is in contact with the cover and has a Shore D hardness of 20 to 60;

the cover is made primarily of a mixture of (F) 100 parts by weight of a resin composition containing an ionomer resin and (G) 5 to 40 parts by weight of an inorganic filler, has a thickness of 0.5 to 2.5 mm and a Shore D hardness of 50 to 70, and satisfies the condition (Shore D hardness of mantle outermost layer)≦(Shore D hardness of cover); and the golf ball has a deflection when subjected to a load of 980 N (100 kgf) of 3.0 to 5.5 mm, wherein component F, the resin composition containing an ionomer resin is composed primarily of a mixture of (M) an amino-terminated block polymer and (N) an ionomer resin in a weight ratio M/N of 3/97 to 60/40.

13. A multi-piece solid golf ball comprising a solid core, a mantle of at least one layer, and a cover, wherein the solid core is made of a rubber composition comprising (A) 100 parts by weight of a base rubber that contains 60 to 100 wt % of a polybutadiene of at least 60% cis-1,4 structure and synthesized using a rare-earth catalyst, (B) 0.1 to 0.8 part by weight of an organic peroxide, (C) an unsaturated carboxylic acid or an unsaturated carboxylic acid metal salt or both, (D) an organic sulfur compound and (E) an inorganic filler, has a deflection when subjected to a load of 980 N (100 kgf) of 3.5 to 6.5 mm, and has a diameter of 30 to 40 mm;

the mantle of at least one layer is made of a thermoplastic resin composition, has a thickness per layer of 0.5 to 2.0 mm, and includes an outermost layer which is in contact with the cover and has a Shore D hardness of 20 to 60;

the cover is made primarily of a mixture of (F) 100 parts by weight of a resin composition containing an ionomer resin and (G) 5 to 40 parts by weight of an inorganic filler, has a thickness of 0.5 to 2.5 mm and a Shore D hardness of 50 to 70, and satisfies the condition (Shore D hardness of mantle outermost layer)≦(Shore D hardness of cover); and the golf ball has a deflection when subjected to a load of 980 N (100 kgf) of 3.0 to 5.5 mm, wherein the cover bears on a surface thereof a plurality of dimples, each dimple having a spatial volume below a planar surface circumscribed by an edge of the dimple and having a surface area circumscribed by the dimple edge on a hypothetical sphere represented by the surface of the golf ball cover were it to have no dimples; which golf ball has a dimple volume occupancy VR, defined as the ratio of the sum of the individual dimple volumes to the volume of the hypothetical sphere, of 0.70 to 1.00%, and a dimple surface coverage SR, defined as the ratio of the sum of the individual dimple surface areas to the surface area of the hypothetical sphere, of 70 to 85%.

14. The multi-piece solid golf ball of claim 1, wherein the organic sulfur compound is selected from the group consisting of pentachlorothiophenol; pentafluorothiophenol; pentabromothiophenol; p-chlorothiophenol; zinc salts of pentachlorothiophenol, pentafluorothiophenol, pentabromothiophenol, or p-chlorothiophenol; diphenylpolysulfides; dibenzylpolysulfides; dibenzoylpolysulfides; dibenzothiazoylpolysulfides; dithiobenzoylpolysulfides having 2 to 4 sulfurs; alkylphenyldisulfides; furan ring-bearing sulfur compounds; and thiophene ring-bearing sulfur compounds.

15. The multi-piece solid golf ball of claim 1, wherein the organic sulfur compound is diphenyldisulfide and/or a zinc salt of pentachlorothiophenol.

16. The multi-piece solid golf ball of claim 1, wherein a second polybutadiene other than said polybutadiene is added and the second polybutadiene is synthesized by using a Group VIII catalyst and has a Mooney viscosity of less than 50.

* * * * *